US011428807B2

(12) United States Patent
Yeon et al.

(10) Patent No.: US 11,428,807 B2
(45) Date of Patent: Aug. 30, 2022

(54) DISPLAY DEVICE

(71) Applicant: Samsung Display Co., LTD., Yongin-si (KR)

(72) Inventors: Eun Kyung Yeon, Suwon-si (KR); Yi Joon Ahn, Seoul (KR); Ga Na Kim, Icheon-si (KR); Jung Hun Noh, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 467 days.

(21) Appl. No.: 16/677,495

(22) Filed: Nov. 7, 2019

(65) Prior Publication Data

US 2020/0209387 A1 Jul. 2, 2020

(30) Foreign Application Priority Data

Dec. 28, 2018 (KR) .................. 10-2018-0173049
Apr. 3, 2019 (KR) .................. 10-2019-0038944

(51) Int. Cl.
*G01S 15/04* (2006.01)
*H04R 1/02* (2006.01)
*H04R 7/04* (2006.01)

(52) U.S. Cl.
CPC .............. *G01S 15/04* (2013.01); *H04R 1/028* (2013.01); *H04R 7/045* (2013.01); *H04R 2499/11* (2013.01); *H04R 2499/15* (2013.01)

(58) Field of Classification Search
CPC .... H04R 1/028; H04R 7/045; H04R 2499/11; H04R 2499/15; H04R 2217/03; H04R 2400/03; G01S 15/04
USPC .................. 381/333, 388; 455/566; 367/118
See application file for complete search history.

(56) References Cited

U.S. PATENT DOCUMENTS

2016/0147305 A1* 5/2016 Hong .................. G09B 21/004
345/175

FOREIGN PATENT DOCUMENTS

| KR | 2001-61692 Y1 | * 12/1999 |
| KR | 200161692 | 12/1999 |
| KR | 1020130057798 | 6/2013 |
| KR | 2018-0103227 | * 9/2018 |
| KR | 101919454 | 11/2018 |

* cited by examiner

*Primary Examiner* — Norman Yu
(74) *Attorney, Agent, or Firm* — Cantor Colburn LLP

(57) ABSTRACT

A display device includes a display panel including a first substrate and a pixel array layer disposed on a first surface of the first substrate, a vibration generator including a sound output unit which vibrates the display panel to output a sound and a first ultrasonic wave output unit which vibrates the display panel to output ultrasonic waves, and a first ultrasonic wave absorbing film overlapping the first ultrasonic wave output unit in a thickness direction of the display panel, where the first ultrasonic wave absorbing film absorbs the ultrasonic waves.

34 Claims, 27 Drawing Sheets

FIG. 1
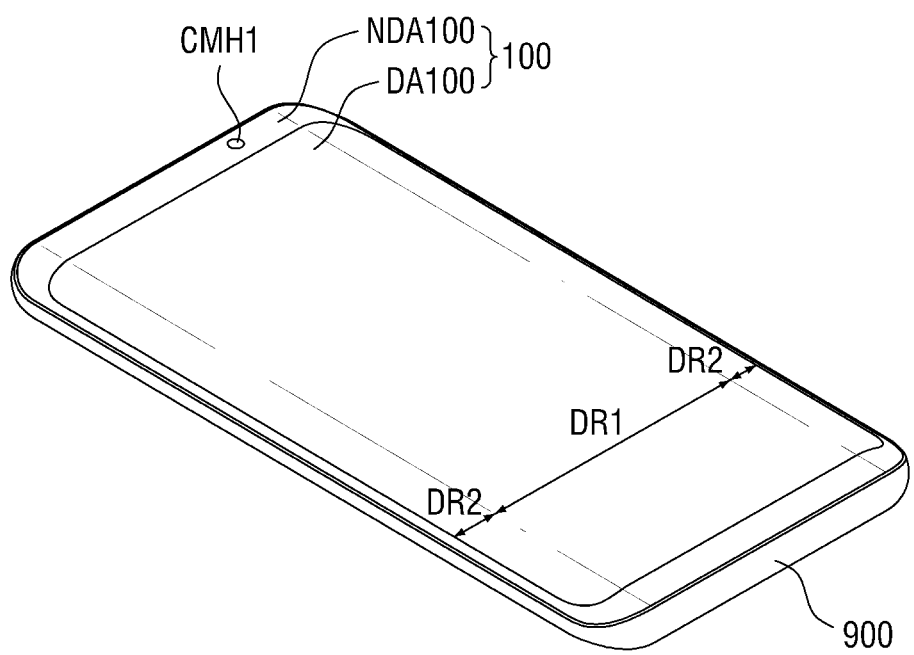
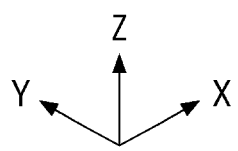

FIG. 9
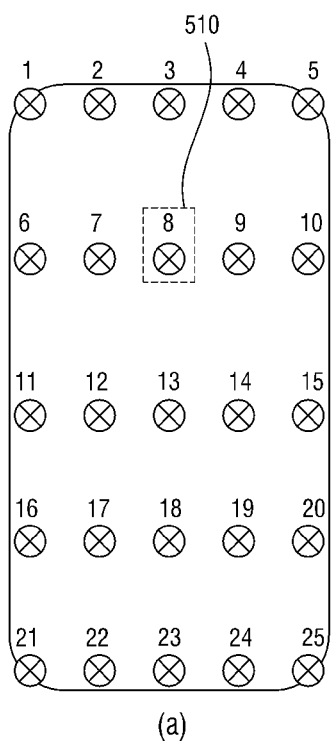
(a)
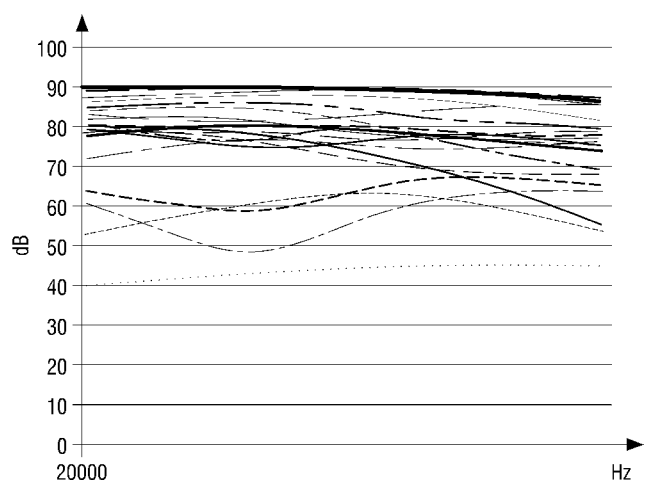
(b)
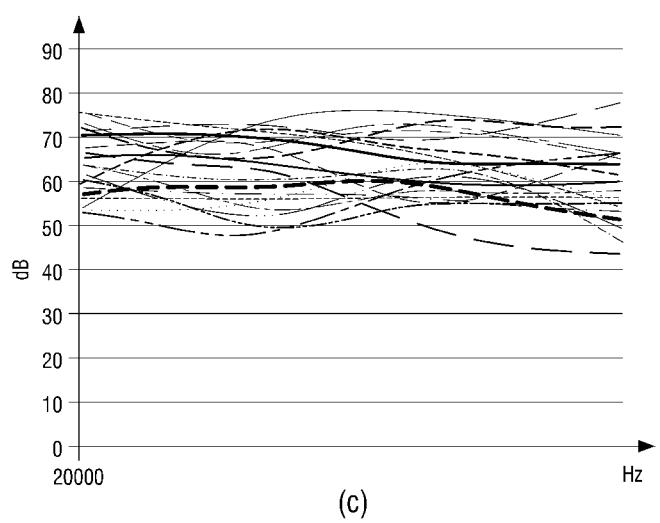
(c)

DISPLAY DEVICE

This application claims priority to Korean Patent Application No. 10-2018-0173049, filed on Dec. 28, 2018, and Korean Patent Application No. 10-2019-0038944, filed on Apr. 3, 2019, and all the benefits accruing therefrom under 35 U.S.C. § 119, the contents of which in their entireties are herein incorporated by reference.

BACKGROUND

1. Field

Embodiments of the invention relate to a display device.

2. Description of the Related Art

With the development of information society, the demand for display devices for displaying images have increased in various forms. More particularly, display devices are applied to various electronic appliances such as smart phones, digital cameras, notebook computers, navigators, and smart televisions, for example. A display device may include a display panel for displaying an image and a sound generator for providing a sound.

SUMMARY

As display devices are applied to various electronic appliances, display devices having various designs are desired. For example, a smart phone may be desired to include a display device capable of increasing a display area by omitting a call receiver for outputting a voice of a counterpart in the sound mode and a proximity sensor for determining whether a user is located close to the front surface of the display device.

Embodiments of the invention are to provide a display device capable of outputting a sound and performing an ultrasonic proximity sensing process using at least one vibration generator not exposed to the outside.

According to an embodiment of the disclosure, a display device includes: a display panel including a first substrate and a pixel array layer disposed on a first surface of the first substrate, a vibration generator disposed on a second surface of the first substrate, which is opposite to the first surface of the first substrate, where the vibration generator outputs ultrasonic waves, and a first ultrasonic wave absorbing film overlapping the vibration generator in a thickness direction of the display panel, where the first ultrasonic wave absorbing film absorbs the ultrasonic waves.

In an embodiment, a first surface of the vibration generator may face the second surface of the first substrate, and the first ultrasonic wave absorbing film may be disposed on a second surface of the vibration generator, which is opposite to the first surface of the vibration generator.

In an embodiment, the display device may further include a second ultrasonic wave absorbing film disposed on a first side surface of the vibration generator, where the second ultrasonic wave absorbing film may absorb the ultrasonic waves.

In an embodiment, the display device may further include a third ultrasonic wave absorbing film disposed on a second side surface of the vibration generator, where the second ultrasonic wave absorbing film may absorb the ultrasonic waves.

In an embodiment, the second ultrasonic wave absorbing film and the third ultrasonic wave absorbing film surround side surfaces of the vibration generator.

In an embodiment, the display device may further include a bottom cover disposed on the second surface of the first substrate, and a fourth ultrasonic wave absorbing film disposed on the bottom cover and absorbing the ultrasonic waves.

In an embodiment, the bottom cover may include a light blocking film disposed on the second surface of the first substrate, a buffer film disposed on the light blocking film, and a heat radiation film disposed on the buffer film, where the fourth ultrasonic wave absorbing film is disposed on the heat radiation film.

In an embodiment, the vibration generator may not overlap the heat radiation film in the thickness direction of the display panel, and the vibration generator may be disposed on the buffer film.

In an embodiment, the display device may further include a frame disposed on the second surface of the first substrate, where the first ultrasonic wave absorbing film is disposed on a first surface of the frame facing the second surface of the first substrate.

According to an embodiment of the disclosure, a display device includes: a display panel including a first substrate and a pixel array layer disposed on a first surface of the first substrate, a vibration generator including a sound output unit which vibrates the display panel to output a sound and a first ultrasonic wave output unit which vibrates the display panel to output ultrasonic waves, and a first ultrasonic wave absorbing film overlapping the first ultrasonic wave output unit in a thickness direction of the display panel, where the first ultrasonic wave absorbing film absorbs the ultrasonic waves.

In an embodiment, the sound output unit may include a first electrode to which a first driving voltage is applied, a second electrode to which a second driving voltage is applied, and a first vibration layer disposed between the first electrode and the second electrode, where the first vibration layer may contract and expand based on the first driving voltage and the second driving voltage, and the first ultrasonic wave output unit may include a third electrode to which a third driving voltage is applied, a fourth electrode to which a fourth driving voltage is applied, and a second vibration layer disposed between the third electrode and the fourth electrode, where the second vibration layer may contract and expand based on the third driving voltage and the fourth driving voltage.

In an embodiment, the first ultrasonic wave output unit may be disposed on a second surface of the first substrate, which is opposite to the first surface of the first substrate, the sound output unit may be disposed on the first ultrasonic wave output unit, and the first ultrasonic wave absorbing film may be disposed on the sound output unit.

In an embodiment, the display device may further include a second ultrasonic wave absorbing film disposed on a first side surface of the first ultrasonic wave output unit, where the second ultrasonic wave absorbing film may absorb the ultrasonic waves.

In an embodiment, the display device may further include a third ultrasonic wave absorbing film disposed on a second side surface of the first ultrasonic wave output unit where the third ultrasonic wave absorbing film may absorb the ultrasonic waves.

In an embodiment, the second ultrasonic wave absorbing film and the third ultrasonic wave absorbing film may surround a side surfaces of the first ultrasonic wave output unit.

In an embodiment, the second ultrasonic wave absorbing film or the third ultrasonic wave absorbing film may be disposed on a side surface of the sound output unit.

In an embodiment, the first ultrasonic wave output unit and the sound output unit may be disposed on a second surface of the first substrate, which is opposite to the first surface of the first substrate, and the first ultrasonic wave absorbing film may be disposed on the first ultrasonic wave output unit.

In an embodiment, the first ultrasonic wave absorbing film may be disposed on the sound output unit.

In an embodiment, a first side surface of the first ultrasonic wave output unit and a first side surface of the sound output unit may be in direct contact with each other.

In an embodiment, the display device may further include a second ultrasonic wave absorbing film disposed on a second side surface of the first ultrasonic wave output unit, wherein the second ultrasonic wave absorbing film may absorb the ultrasonic waves, and a third ultrasonic wave absorbing film disposed on a second side surface of the sound output unit, where the third ultrasonic wave absorbing film may absorb the ultrasonic waves.

In an embodiment, the second ultrasonic wave absorbing film may surround side surfaces of the first ultrasonic wave output unit, and the third ultrasonic wave absorbing film may surround side surfaces of the sound output unit.

In an embodiment, the vibration generator may further include a second ultrasonic wave output unit which vibrates the display panel to output the ultrasonic waves.

In an embodiment, the second ultrasonic wave output unit may include a fifth electrode to which a fifth driving voltage is applied, a sixth electrode to which a sixth driving voltage is applied, and a third vibration layer disposed between the fifth electrode and the sixth electrode, where the third vibration layer may contract and expand based on In an embodiment, the first ultrasonic wave output unit may be disposed on a second surface of the first substrate, which is opposite to the first surface of the first substrate, the sound output unit may be disposed on the first ultrasonic wave output unit, the second ultrasonic wave output unit may be disposed on the sound output unit, and the first ultrasonic wave absorbing film may be disposed on the second ultrasonic wave output unit.

In an embodiment, the display device may further include a second ultrasonic wave absorbing film disposed on a first side surface of the second ultrasonic wave output unit, where second ultrasonic wave absorbing film may absorb the ultrasonic waves.

In an embodiment, the display device may further include a third ultrasonic wave absorbing film disposed on a second side surface of the second ultrasonic wave output unit, where the third ultrasonic wave absorbing film may absorb the ultrasonic waves.

In an embodiment, the second ultrasonic wave absorbing film and the third ultrasonic wave absorbing film may surround side surfaces of the second ultrasonic wave output unit.

In an embodiment, the second ultrasonic wave absorbing film may be disposed on a first side surface of the first ultrasonic wave output unit and a first side surface of the sound output unit.

In an embodiment, the first ultrasonic wave output unit, the sound output unit, and the second ultrasonic wave output unit may be disposed on a second surface of the first substrate, which is opposite to first surface of the first substrate, and the first ultrasonic wave absorbing film may be disposed on the first ultrasonic wave output unit and the second ultrasonic wave output unit.

In an embodiment, the first ultrasonic wave absorbing film may be disposed on the sound output unit.

In an embodiment, the sound output unit may be disposed between the first ultrasonic wave output unit and the second ultrasonic wave output unit.

In an embodiment, a first side surface of the first ultrasonic wave output unit and a first side surface of the sound output unit may be in direct contact with each other, and a second side surface of the second ultrasonic wave output unit and a first side surface of the sound output unit may be in direct contact with each other.

In an embodiment, the display device may further include a second ultrasonic wave absorbing film disposed on the second side surface of the first ultrasonic wave output unit, where the second ultrasonic wave absorbing film may absorb the ultrasonic waves, and a third ultrasonic wave absorbing film disposed on a second side surface of the second ultrasonic wave output unit, where the third ultrasonic wave absorbing film may absorb the ultrasonic waves.

In an embodiment, the second ultrasonic wave absorbing film may surround side surfaces of the first ultrasonic wave output unit, and the third ultrasonic wave absorbing film may surround side surfaces of the second ultrasonic wave output unit.

BRIEF DESCRIPTION OF THE DRAWINGS

The above and other features of the invention will become more apparent by describing in detail exemplary embodiments thereof with reference to the attached drawings, in which:

FIG. 1 is a perspective view of a display device according to an embodiment;

FIG. 9 is a graph showing ultrasonic waves generated by the vibration generator on the first surface and second surface of the display device;

DETAILED DESCRIPTION

Figure 2:
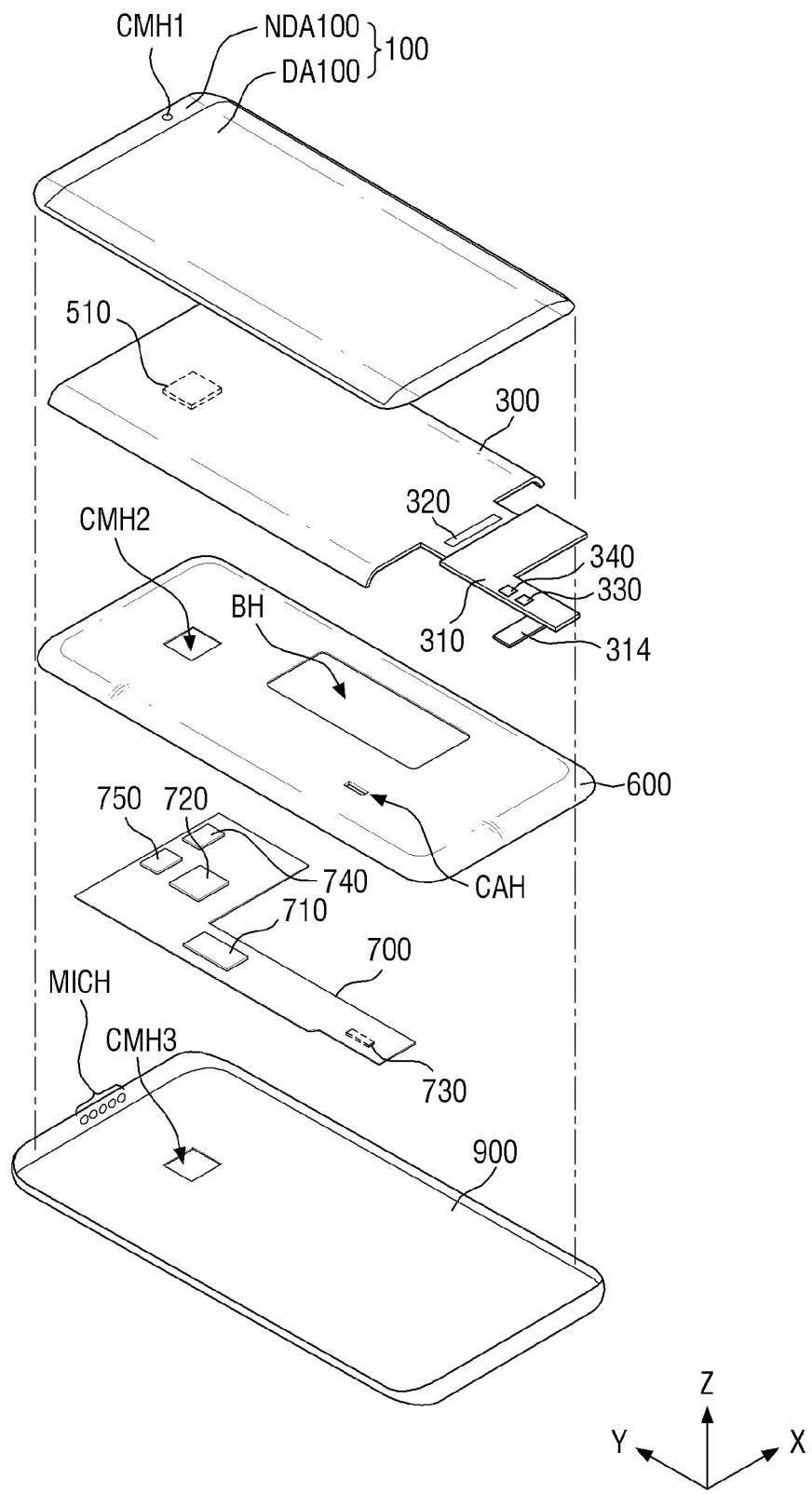
FIG. 2 is an exploded perspective view of a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a perspective view of a display device according to an embodiment, and FIG. 2 is an exploded perspective view of a display device according to an embodiment.

Referring to FIGS. 1 and 2, an embodiment of a display device 10 includes a cover window 100, a display panel 300, a display circuit board 310, a display driving circuit 320, a bottom cover 400, a vibration generator 510, a middle frame 600, a main circuit board 700, and a lower cover 900.

Herein, the terms "on", "over", "top", "upper side", or "upper surface" refers to a direction in which the cover window 100 is disposed with respect to the display panel 300, that is, a Z-axis direction, and the "beneath", "under", "bottom", "lower side", or "lower surface" refers to a direction in which the middle is frame 600 is disposed with respect to the display panel 300, that is, a direction opposite to the Z-axis direction. Further, the terms "left", "right", "upper", and "lower" refer to directions when the display panel 300 is viewed from a top plan view. For example, the "left" refers to a direction opposite to the X-axis direction, the "right" refers to the X-axis direction, the "upper" refers to the Y-axis direction, and the "lower" refers to a direction opposite to the Y-axis direction.

In an embodiment, the display device 10 may have a rectangular shape in a plan view. In one embodiment, for example, as shown in FIGS. 1 and 2, the display device 10 may have a rectangular shape having short sides in the first direction (X-axis direction) and long sides in the second direction (Y-axis direction) in a plan view. The edge where the short side in the first direction (X-axis direction) meets the long side in the second direction (Y-axis direction) may have a round shape with a predetermined curvature or have a right-angled shape. The shape of the display device 10 is not limited to a rectangular shape, and may be variously modified to have another polygonal shape, circular shape, or elliptical shape.

The display device 10 may include a first area DR1, which is flat, and a second area DR2 extending from the right and left sides of the first area DR1. The second area DR2 may be flat or curved. In an embodiment, where the second area DR2 is flat, the angle formed by the first area DR1 and the second area DR2 may be an obtuse angle. In an alternative embodiment, where the second area DR2 is curved, the second area DR2 may have a constant curvature or a variable curvature.

In an embodiment, as shown in FIG. 1, the second area DR2 extends from the left and right sides of the first area DR1, but the invention is not limited thereto. Alternatively, the second area DR2 may extend from only one of the left and right sides of the first area DR1. Alternatively, the second area DR2 may extend from only one of the upper and lower sides of the first area DR1 as well as only one of the left and right sides of the first area DR1. Hereinafter, for convenience of description, embodiments where the second area DR2 is disposed along the left and right edges of the display device 10 as shown in FIGS. 1 and 2 will be described in detail.

In an embodiment, the cover window 100 may be disposed on the display panel 300 to cover the upper surface of the display panel 300. In such an embodiment, the cover window 100 may protect the upper surface of the display panel 300.

The cover window 100 may include a light transmitting area DA100 corresponding to a display area of the display panel 300 and a light blocking area NDA100 corresponding to an area other than the display panel 300. The cover window 100 may be disposed in the first area DR1 and the second area DR2, and the light transmitting area DA100 may be disposed in a part of the first area DR1 and a part of the second area DR2. The light blocking area NDA100 may be opaque. Alternative, the light blocking area NDA100 may be a decorative layer having a pattern that can be seen to a user. In one embodiment, for example, a company logo or various characters may be patterned on the light blocking area NDA100. In an embodiment, the light blocking area NDA100 may be provided with a first camera hole CMH1 for exposing a front camera 740, but the invention is not limited thereto. In one embodiment, for example, the first camera hole CMH1 may be defined in the light transmitting area DA100, not in the light blocking area NDA100. In such an embodiment, a through-hole for exposing the front camera 740 may be defined in the display panel 300.

The display panel 300 may be disposed under the cover window 100. The display panel 300 may be disposed to overlap the light transmitting area 100DA of the cover window 100. The display panel 300 may be disposed in the first area DR1 and the second areas DR2. Thus, the image of the display panel 300 may be seen not only in the first area DR1 but also in the second areas DR2.

The display panel 300 may be a light emitting display panel including a light emitting element. In an embodiment, the display panel 300 may include at least one of an organic light emitting display panel using an organic light emitting diode including an organic light emitting layer, an ultra-micro light emitting diode display panel using an ultra-micro light emitting diode ("ultra-micro LED"), a quantum dot light emitting diode display panel using a quantum dot light emitting diode including a quantum dot light emitting layer, and an inorganic light emitting display panel using an inorganic light emitting diode including an inorganic semiconductor, for example. Hereinafter, for convenience of description, embodiments where the display panel 300 is an organic light emitting display panel will be described in detail.

The display circuit board 310 and the display driving circuit 320 may be attached to a side portion of the display panel 300. One end of the display circuit board 310 may be attached onto pads disposed on the side portion of the display panel 300 via an anisotropic conductive film. The display circuit board 310 may be a flexible printed circuit board.

The display driving circuit 320 receives control signals and power supply voltages through the display circuit board 310 and generates and outputs signals and voltages for driving the display panel 300. The display driving circuit 320 may be formed as (or defined by) an integrated circuit and may be attached onto the protruding area PA of the display panel 300 using a chip-on-glass ("COG") manner, a chip-on-plastic ("COP") manner, or an ultrasonic manner, but the invention is not limited thereto. In one embodiment, for example, the display driving circuit 320 may be attached onto the display circuit board 310.

A touch driving circuit 330 may be disposed on the display circuit board 310. The touch driving circuit 330 may be formed as an integrated circuit and may be attached to the upper surface of the display circuit board 310. The touch driving circuit 330 may be connected to the touch electrodes and touch lines of a touch sensor layer 306 (shown in FIG. 8) of the display panel 300 through the display circuit board 310. The touch driving circuit 330 may apply touch driving signals to driving electrodes among the touch electrodes in a mutual capacitance manner, and may sense the charge variations of capacitances between the driving electrodes and the sensing electrodes through the sensing electrodes among the touch electrodes, thereby sensing a touch.

A vibration driving circuit 340 may be disposed on the display circuit board 310. The vibration driving circuit 340 receives first vibration data from a main processor 710 in a sound mode. The vibration driving circuit 340 generates a first first driving voltage and a second first driving voltage according to the first vibration data and outputs the first first driving voltage and the second first driving voltage to the vibration generator 510. The vibration generator 510 may be vibrated in a first frequency band according to the first first driving voltage and the second first driving voltage, and may vibrate the display panel 300 to output a first sound.

The vibration driving circuit 340 receives second vibration data from the main processor 710 in an ultrasonic mode. The vibration driving circuit 340 generates a first second driving voltage and a second second driving voltage according to the second vibration data and outputs the first second driving voltage and the second second driving voltage to the vibration generator 510. The vibration generator 510 may be vibrated in a second frequency band according to the first second driving voltage and the second second driving voltage, and may vibrate the display panel 300 to output ultrasonic waves. The second frequency band may be a frequency band higher than the first frequency band.

The vibration driving circuit 340 may include a digital signal processor ("DSP") for processing the first vibration data and the second vibration data which are digital signals, a digital-analog converter ("DAC") for converting the vibration data processed from the DSP into driving voltages which are analog signals, and an amplifier ("AMP") for amplifying and outputting the driving voltages.

The vibration generator 510 may be disposed under the display panel 300. The vibration generator 510 may include a piezoelectric element or a piezoelectric actuator for vibrating the display panel 300 using a piezoelectric material which contracts or expands depending on a voltage applied thereto.

In an embodiment, as illustrated in FIG. 2, the vibration generator 510 is located close to the upper side of the display panel 300, but the location of the vibration generator 510 is not limited thereto. Alternatively, the vibration generator 510 may be disposed in an area where there is no mechanical interference with the display circuit board 310 and the battery hole BH and second camera hole CMH2 defined in the middle frame 600. In such an embodiment, the vibration generator 510 may not overlap the display circuit board 310 and the battery hole BH and second camera hole CMH2 in the middle frame 600 when viewed from a plan view in a thickness direction (Z-axis direction) of the display panel.

The middle frame 600 may be disposed under the display panel 300. The middle frame 600 may include a plastic, a metal, or a combination thereof.

The middle frame 600 may be provided with a second camera hole CMH2 into which a camera device 720 is inserted, a battery hole BH in which a battery is disposed, and a cable hole CAH through which a cable 314 connected to the display circuit board 310 is disposed.

If the vibration generator 510 overlaps the battery hole BH in which a battery is disposed, the vibration generator 510 may be affected by the heat generated from the battery. Therefore, in an embodiment, the vibration generator 510 is disposed not to overlap the battery hole BH in the thickness direction (Z-axis direction) of the display panel.

The main circuit board 700 may be disposed under the middle frame 600. The main circuit board 700 may be a printed circuit board or a flexible printed circuit board.

The main circuit board 700 may include a main processor 710, a camera device 720, a main connector 730, a front camera 740, and a microphone 750. The camera device 720 may be disposed on both the upper surface and lower surface of the main circuit board 700, the main processor 710 may be disposed on the upper surface of the main circuit board 700, and the main connector 730 may be disposed on the lower surface of the main circuit board 700.

The main processor 710 may control the overall operation of the display device 10. In one embodiment, for example, the main processor 710 may output digital video data to the display driving circuit 320 through the display circuit board 310 such that the display panel 300 displays an image. In an embodiment, the main processor 710 may receive touch data from the touch driving circuit 330, determine the touch position of a user, and then execute an application indicated by an icon displayed at the touch position of the user. In an embodiment, the main processor 710 may receive touch data from the touch driving unit 220, and may execute an application indicated by an icon displayed at the touch position of the user according to the touch data.

The main processor 710 may output first vibration data to the vibration driving circuit 340 for driving the vibration generator 510 to allow the display panel 300 to be vibrated by the vibration generator 510 to output a sound in a sound mode. The main processor 710 may output second vibration data to the vibration driving circuit 340 for driving the vibration generator 510 to allow the display panel 300 to be vibrated by the vibration generator 510 to output ultrasonic waves in an ultrasonic mode.

The main processor 710 may be an application processor, a central processing unit, or a system chip, which includes an integrated circuit.

The camera device 720 processes an image frame such as a still image or a moving image obtained by an image sensor in a camera mode, and outputs the processed image frame to the main processor 710.

The cable disposed through the cable hole CAH of the middle frame 600 may be connected to the man connector 730. Thus, the main circuit board 700 may be electrically connected to the display circuit board 310 and the touch circuit board 210.

The main circuit board 700 may be provided with the microphone 750 for sensing the ultrasonic waves generated by vibrating the display panel 300 using the vibration generator 510. The microphone 750 may be exposed to an outside through a microphone hole MICH defined through the upper side portion of the lower cover 900.

In an embodiment, the main circuit board 700 may be further provided with a mobile communication module capable of transmitting and receiving a radio signal to/from at least one of a base station, an external terminal, and a server. The radio signal may include various types of data corresponding to a voice signal, a video call signal, or a text/multimedia message transmission/reception.

The lower cover 900 may be disposed under the middle frame 600 and the main circuit board 700. The lower cover 900 may be engaged and fixed to the middle frame 600. The lower cover 900 may define a lowermost surface of the display device 10. The lower cover 900 may include a plastic and/or a metal.

The lower cover 900 may be provided with a third camera hole CMH3 into which the camera device 720 is inserted to protrude outward. The position of the camera device 720 and the positions of the second and third camera holes CMH2 and CMH3 corresponding to the camera device 720 are limited to those of the embodiment shown in FIG. 2.

According to an embodiment, as shown in FIGS. 1 and 2, the vibration generator 510 for vibrating the display panel 300 to output a sound or ultrasonic waves is disposed on a surface of the display panel 300 such that sound or ultrasonic waves may be output using the display panel 300 as a vibration surface by using the vibration generator 510 which is not exposed to an outside. Accordingly, in such an embodiment, a call receiver for outputting a voice of the counterpart on the front face of the display device and a proximity sensor for determining whether the user is located close to the front surface of the display device may be omitted, such that the light transmitting area DA100 of the cover window 100 may be enlarged, and thus the area where the image is displayed by the display panel 300 may be enlarged.

Figure 3:
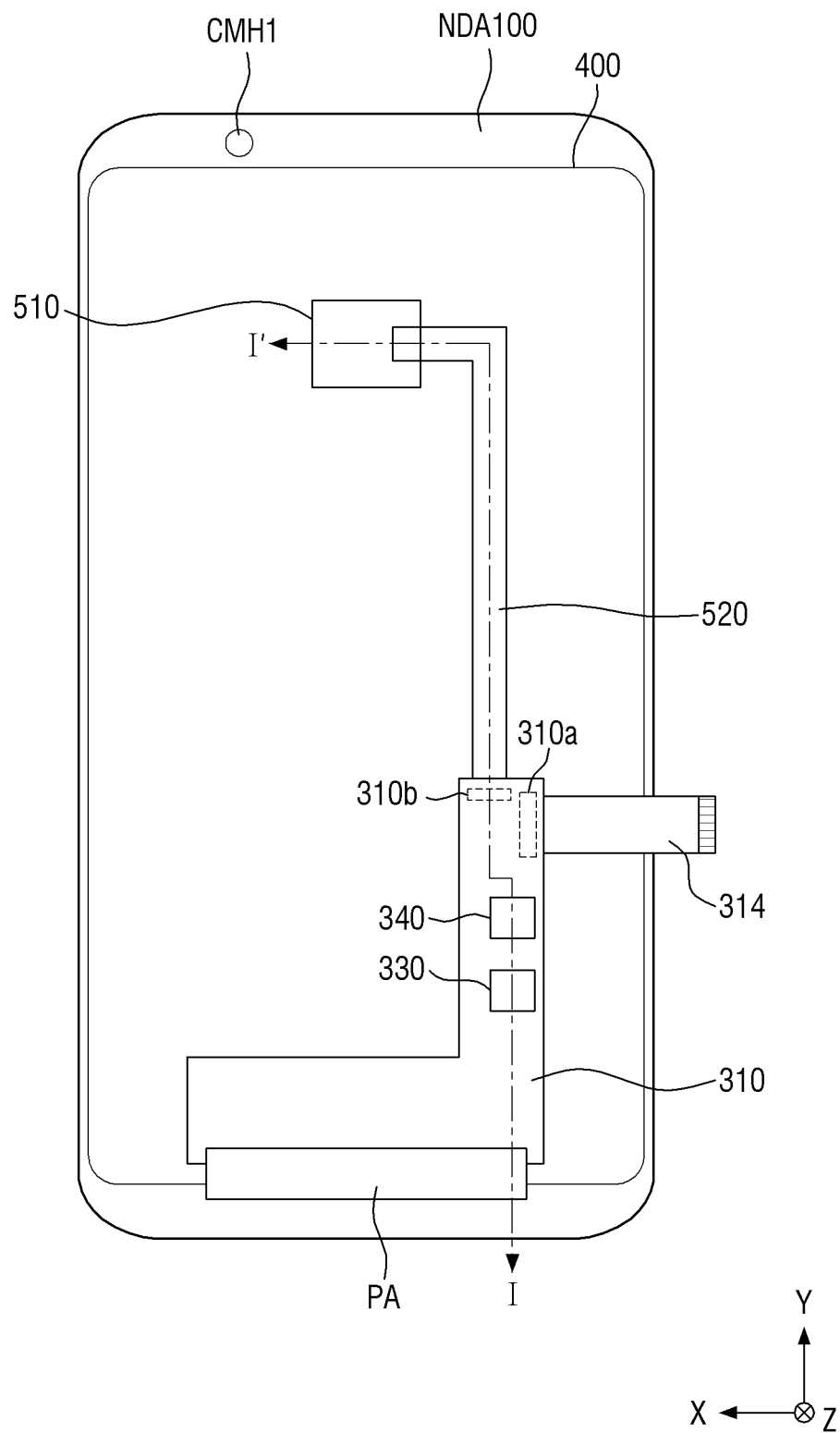
FIG. 3 is a bottom view showing an embodiment of a cover window attached to the cover window of FIG. 2.
Figure 4:
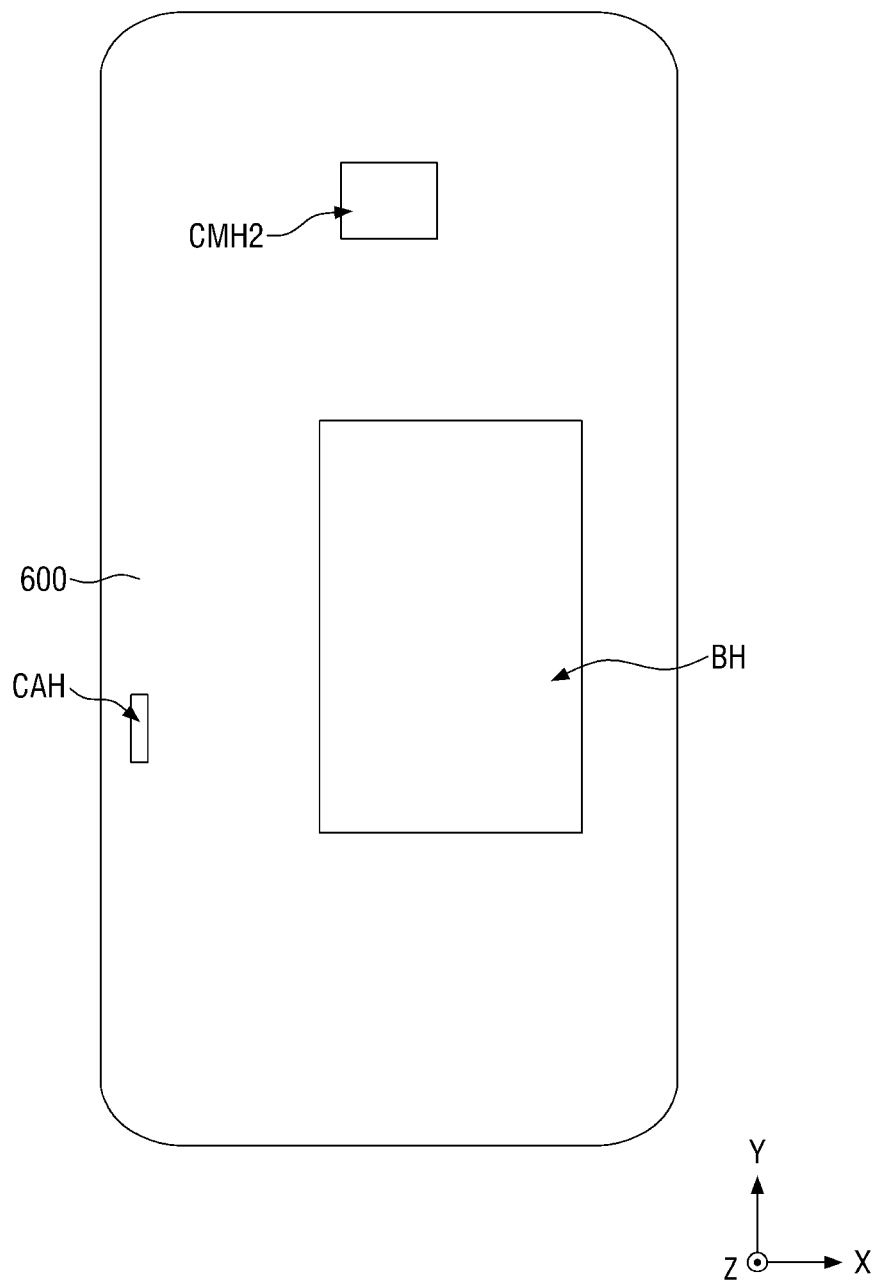
FIG. 4 is a plan view showing an embodiment of the middle frame of FIG. 2.
Figure 5A:
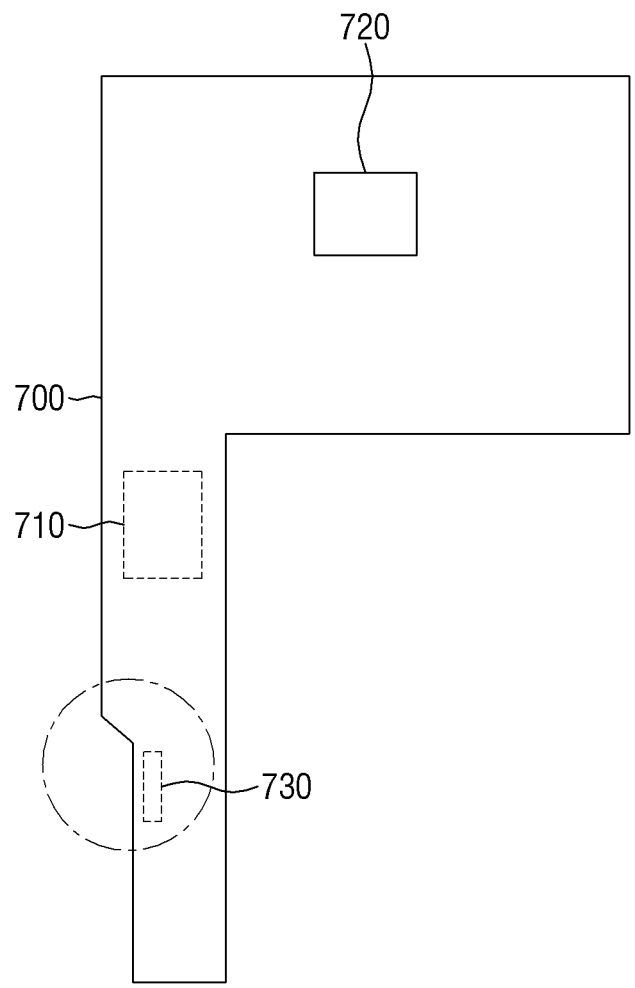
FIG. 5A is a plan view showing an embodiment of the main circuit board of FIG. 2.
Figure 5B:
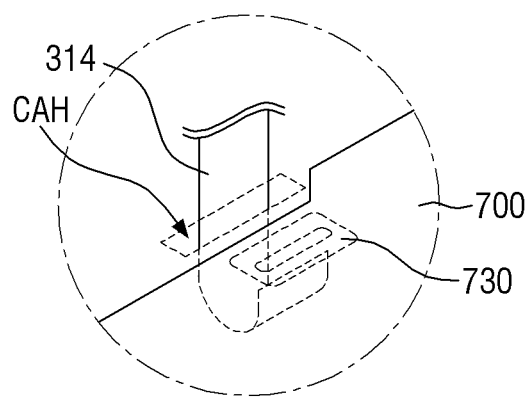
FIG. 5B is an enlarged view of the encircled portion of FIG. 5A.

FIG. 3 is a bottom view showing an embodiment of a cover window attached to the cover window of FIG. 2, FIG. 4 is a plan view showing an embodiment of the middle frame of FIG. 2, FIG. 5A is a plan view showing the main circuit board of FIG. 2, and FIG. 5B is an enlarged view of the encircled portion of FIG. 5A.

Referring to FIGS. 3 to 5A, in an embodiment, the bottom cover 400 may be disposed under the display panel 300. The bottom cover 400 may be attached to the lower surface of the display panel 300 through an adhesive member. The adhesive member may be a pressure sensitive adhesive ("PSA").

The vibration generator 510 may be disposed under the bottom cover 400. The vibration generator 510 may be attached to the lower surface of the bottom cover 400 through an adhesive member. The adhesive member may be a PSA.

The vibration generator 510 may be electrically connected to the vibration driving circuit 340 for driving the vibration generator 510 through a flexible circuit board 520. In an embodiment, as shown in FIG. 3, the flexible circuit board 520 is flat, but the shape of the flexible circuit board 520 is not limited thereto. Alternatively, the flexible circuit board 520 may be a flexible printed circuit board that can be bent.

The display circuit board 310 may be bent as shown in FIG. 3 to be disposed under the bottom cover 400. The display circuit board 310 may include a first connector 310a and a second connector 310b as shown in FIG. 3. The first connector 310a may be connected to an end of the cable 314. The second connector 310b may be connected to an end of the flexible circuit board 520. The touch driving circuit 330 and the vibration driving circuit 340 may be disposed on a surface of the display circuit board 310, and the first connector 310a and the second connector 310b may be disposed on an opposing surface of the display circuit board 310 which is opposite to the surface thereof. The opposing surface of the display circuit board 310 may be a surface facing the bottom cover 400.

The end of the cable 314 may be connected to the first connector 310a. Another end of the cable 314 may be connected to the main connector 730 of the main circuit board 700 disposed under the middle frame 600 through which a cable hole CAH is defined, as shown in FIGS. 4, 5A and 5B.

An end of the flexible circuit board 520 may be connected to the second connector 310b. Another end of the flexible circuit board 520 may be provided with a pad portion including pads electrically connected to the vibration generator 510.

Figure 6:
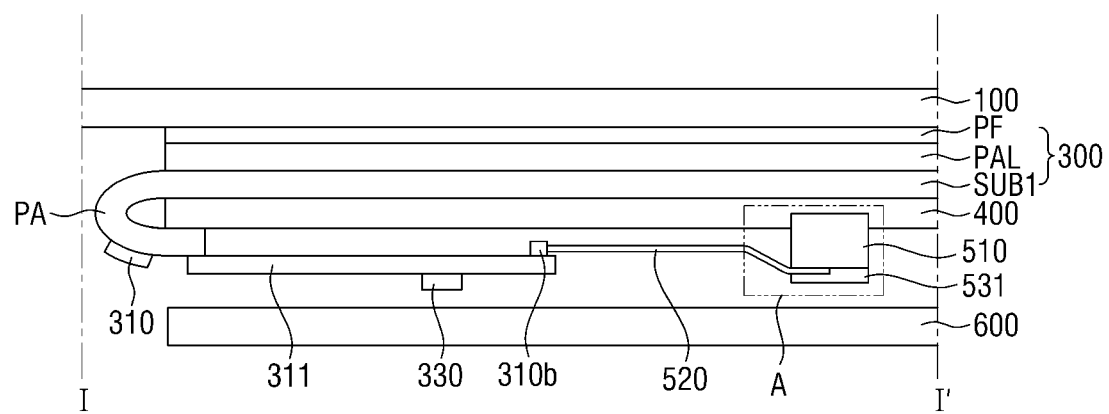
FIG. 6 is a cross-sectional view taken along line I-I' of FIG. 3 according to an embodiment.
Figure 7:
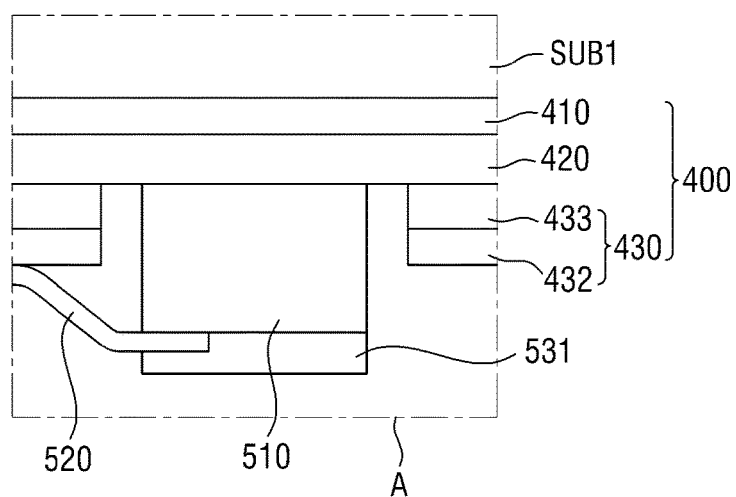
FIG. 7 is an enlarged cross-sectional view of the area A of FIG. 6.
Figure 8:
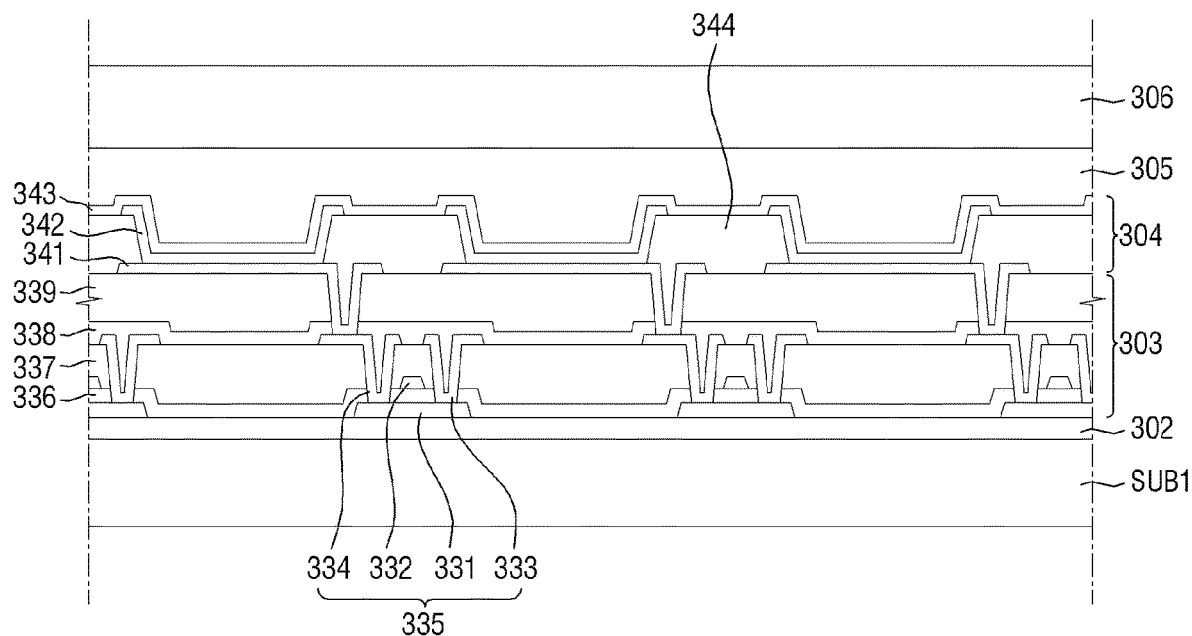
FIG. 8 is a cross-sectional view showing a display area of the display panel of FIG. 6.

FIG. 6 is a cross-sectional view taken along I-I' of FIG. 3 according to an embodiment, FIG. 7 is an enlarged cross-sectional view of the area A of FIG. 6, and FIG. 8 is a cross-sectional view showing a display area of the display panel of FIG. 6.

Referring to FIGS. 6 to 8, the display panel 300 may include a substrate SUB1 and a pixel array layer PAL. The pixel array layer PAL may include a thin film transistor layer 303, a light emitting element layer 304, and a thin film encapsulation layer 305 as shown in FIG. 8. The display area DA of the display panel 300 indicates an area where pixels of the light emitting element layer 304 are disposed to display an image, and the non-display area NDA thereof indicates a peripheral area of the display area DA.

The substrate SUB1 may be a rigid substrate or a flexible substrate capable of bending, folding, rolling, or the like. The substrate SUB1 may include or be made of an insulating material such as glass, quartz, or a polymer resin. In an embodiment, the polymer resin may include polyethersulphone ("PES"), polyacrylate ("PA"), polyarylate ("PAR"), polyetherimide ("PEI"), polyethylenenapthalate ("PEN"), polyethylene terepthalate ("PET"), polyphenylenesulfide ("PPS"), polyallylate, polyimide ("PI"), polycarbonate ("PC"), cellulosetriacetate ("CAT"), cellulose acetate propionate (CAP), and combinations thereof. Alternatively, the substrate SUB1 may include a metal material.

The thin film transistor layer 303 is disposed on the substrate SUB1. The thin film transistor layer 303 includes thin film transistors 335, a gate insulating film 336, an interlayer insulating film 337, a protective film 338, and a planarization film 339.

A buffer film 302 may be disposed on the substrate SUB1. The buffer film 302 may be formed on the substrate SUB1 to protect thin film transistors 335 and light emitting elements from moisture that may penetrate through the substrate SUB1 which is vulnerable to moisture. The buffer film 302 may include or be formed of a plurality of alternately laminated inorganic films. In one embodiment, for example, the buffer film 302 may be formed as a multi-layer film in which one or more inorganic layers including one or more of a silicon oxide (SiOx), a silicon nitride (SiNx), and SiON are alternately stacked on one another. Alternatively, the buffer film 302 may be omitted.

The thin film transistors 335 are disposed on the buffer film 302. Each of the thin film transistors 335 includes an active layer 331, a gate electrode 332, a source electrode 333, and a drain electrode 334. In an embodiment, as shown in FIG. 8, the thin film transistor 335 is formed by a top gate manner in which the gate electrode 332 is located on the active layer 331, but the invention is not limited thereto. Alternatively, the thin film transistors 335 may be formed by a bottom gate manner in which the gate electrode 332 is located beneath the active layer 331, or may be formed by a double gate manner in which the gate electrode 332 is located both on and beneath the active layer 331.

The active layer 331 is disposed on the buffer film 302. The active layer 331 may include or be formed of a silicon-based semiconductor material or an oxide-based semiconductor material. A light blocking layer for blocking external light incident on the active layer 331 may be disposed between the buffer film 302 and the active layer 331.

The gate insulating film 336 may be disposed on the active layer 331. The gate insulating film 336 may include or be formed of an inorganic film, for example, a silicon oxide (SiOx) film, a silicon nitride (SiNx) film, or a multi-layer film thereof.

The gate electrode 332 and a gate line may be disposed on the gate insulating film 336. The gate electrode 332 and the gate line may include or be formed of a single layer or a multi-layer including at least one of molybdenum (Mo), aluminum (Al), chromium (Cr), gold (Au), titanium (Ti), nickel (Ni), neodymium (Nd) and copper (Cu), or an alloy thereof.

The interlayer insulating film 337 may be disposed on the gate electrode 332 and the gate line. The interlayer insulating film 337 may include or be formed of an inorganic film, for example, a silicon oxide (SiOx) film, a silicon nitride (SiNx) film, or a multi-layer film thereof.

The source electrode 333, the drain electrode 334, and a data line may be disposed on the interlayer insulating film. Each of the source electrode 333 and the drain electrode 334 may be connected to the active layer 331 through a contact hole defined through the gate insulating film 336 and the interlayer insulating film 337. The source electrode 333, the drain electrode 334, and the data line may include or be formed of a single layer or a multi-layer including at least one of molybdenum (Mo), aluminum (Al), chromium (Cr), gold (Au), titanium (Ti), nickel (Ni), neodymium (Nd) and copper (Cu), or an alloy thereof.

The protective film 338 for insulating the thin film transistor 335 may be disposed on the source electrode 333, the drain electrode 334, and the data line. The protective film 338 may include or be formed of an inorganic film, for example, a silicon oxide (SiOx) film, a silicon nitride (SiNx) film, or a multi-layer film thereof.

The planarization film 339 for flattening a step due to the thin film transistor 335 may be formed on the protective film 338. The planarization film 339 may include or be formed of an organic film including an acryl resin, an epoxy resin, a phenolic resin, a polyamide resin, or a polyimide resin.

The light emitting element layer 304 is disposed on the thin film transistor layer 303. The light emitting element layer 304 includes light emitting elements and a pixel defining film 344.

The light emitting elements and the pixel defining film 344 are disposed on the planarization film 339. The light emitting element may be an organic light emitting element including an anode electrode 341, a light emitting layer 342, and a cathode electrode 343.

The anode electrode 341 may be disposed on the planarization film 339. The anode electrode 341 may be connected to the source electrode 333 of the thin film transistor 335 through a contact hole defined through the protective film 338 and the planarization film 339.

The pixel defining film 344 may be disposed on the planarization film 339 to cover the edge of the anode electrode 341 to define pixels. In such an embodiment, the pixel defining film 344 serves to define pixels. Each of the pixels refers to an area where the anode electrode 341, the light emitting layer 342, and the cathode electrode 343 are sequentially laminated, and holes from the anode electrode 341 and electrons from the cathode electrode 343 are combined with each other in the light emitting layer 342 to emit light.

The light emitting layers 342 are disposed on the anode electrode 341 and the pixel defining film 344. The light emitting layers 342 are organic light emitting layers. In an embodiment, the light emitting layer 342 may emit one of a red light, a green light, and a blue light. In an alternative embodiment, the light emitting layer 342 may be a white light emitting layer that emits white light. In such an embodiment, the light emitting layer 342 may have a laminate structure of a red light emitting layer, a green light emitting layer, and a blue light emitting layer, and may be a common layer formed commonly in the pixels. In such an embodiment, the display panel 300 may further include separate color filters for displaying red, green, and blue colors.

The light emitting layer 342 may include a hole transporting layer, a light emitting layer, and an electron transporting layer. In an embodiment, the light emitting layer 342 may have a tandem structure of two stacks or more, and in this case, a charge generating layer may be disposed between the stacks.

The cathode electrode 343 is disposed on the light emitting layer 342. The cathode electrode 343 may be disposed to cover the light emitting layer 342. The cathode electrode 343 may be a common layer formed commonly in the pixels or disposed to cover the entire pixels.

In an embodiment, where the light emitting element layer 304 is formed by a top emission manner in which light is emitted upward, the anode electrode 341 may include or be formed of a high-reflectance metal material such as a laminate structure (Ti/Al/Ti) of aluminum and titanium, a laminate structure (ITO/Al/ITO) of aluminum and indium tin oxide ("ITO"), or a laminate structure (ITO/APC/ITO) of an APC alloy and ITO. The APC alloy refers to an alloy of silver (Ag), palladium (Pd), and copper alloy (Cu). The cathode electrode 343 may include or be formed of a transparent conductive material ("TCO") such as ITO or indium zinc oxide ("IZO"), which is light-transmissive, or a semi-transmissive conductive material such as magnesium (Mg), silver (Ag), or an alloy of magnesium (Mg) and silver (Ag). In an embodiment, where the cathode electrode 343 includes or is formed of a semi-transmissive conductive material, light emission efficiency may be increased by microcavity effects.

In an embodiment, where the light emitting element layer 304 is formed by a bottom emission manner in which light is emitted downward, the anode electrode 341 may include or be formed of a TCO such as ITO or IZO, or a semi-transmissive conductive material such as magnesium (Mg), silver (Ag), or an alloy of magnesium (Mg) and silver (Ag). The cathode electrode 343 may be formed of a high-reflectance metal material such as a laminate structure (Ti/Al/Ti) of aluminum and titanium, a laminate structure (ITO/Al/ITO) of aluminum and ITO, an APC alloy, or a laminate structure (ITO/APC/ITO) of an APC alloy and ITO. In an embodiment, where the anode electrode 341 includes or is formed of a semi-transmissive conductive material, light emission efficiency may be increased by microcavity effects.

The thin film encapsulation layer 305 is disposed on the light emitting element layer 304. In an embodiment, the thin film encapsulation layer 305 serves to prevent oxygen or moisture from permeating the light emitting layer 342 and the cathode electrode 343. In such an embodiment, the thin film encapsulation layer 305 may include at least one inorganic film. The inorganic film may include or be formed of silicon nitride, aluminum nitride, zirconium nitride, titanium nitride, hafnium nitride, tantalum nitride, silicon oxide, aluminum oxide, or titanium oxide. The thin film encapsulation layer 305 may further include at least one organic film. The organic film may have a sufficient thickness to prevent foreign matter (particles) from penetrating the thin film encapsulation layer 305 and entering the light emitting layer 342 and the cathode electrode 343. The organic film may include at least one of epoxy, acrylate, and urethane acrylate.

A touch sensor layer 306 may be disposed on the thin film encapsulation layer 305. In an embodiment, the touch sensor layer 306 may be formed directly on the thin film encapsulation layer 305, such that the thickness of the display device 10 may be reduced, compared to a case where a separate touch panel is attached onto the thin film encapsulation layer 305.

The touch sensor layer 306 may include touch electrodes for sensing a touch of a user in a capacitance manner, and touch lines for connecting the pads and the touch electrodes.

In one embodiment, for example, the touch sensor layer 306 may sense a user's touch by a self-capacitance manner or a mutual capacitance manner.

The touch electrodes of the touch sensor layer 306 may be arranged in the display area DA, and the touch lines of the touch sensor layer 306 may be arranged in the non-display area NDA.

A polarizing film PF may be disposed on the pixel array layer PAL of the display panel 300 to prevent the deterioration of visibility due to external light reflection as shown in FIG. 6. The polarizing film PF may include a linear polarizer and a phase retardation film such as a quarter-wave plate. In such an embodiment, the phase retardation film may be disposed on the display panel 300, and the linear polarizer may be disposed between the phase retardation film and the cover window 100.

The cover window 100 may be disposed on the polarizing film PF. The cover window 100 may be attached to the upper surface of the polarizing film PF through an adhesive member. The cover window 100 may be made of glass, sapphire, and/or plastic. The cover window 100 may be rigid or flexible. The adhesive member may be an optically clear adhesive ("OCA") film or an optically clear resin ("OCR") film.

The bottom cover 400 may be disposed under the substrate SUB1 of the display panel 300. In an embodiment, as shown in FIG. 7, the bottom cover 400 may include a light blocking film 410 for absorbing light incident from the outside, a buffer film 420 for absorbing external impact, and a heat radiation film 430 for efficiently radiating heat of the display panel 300.

The light blocking film 410 may be disposed under the display panel 300. The light blocking film 410 inhibits the transmission of light to prevent components disposed under the light blocking film, for example, a display circuit board 310, a vibration generator 510, and the like from being viewed from above the display panel 300. The light blocking film 410 may include a light absorbing film including a black pigment or a dye, for example.

The buffer film 420 may be disposed under the light blocking film 410. The buffer film 420 absorbs an external impact to prevent the display panel 300 from being damaged. The buffer film 420 may be formed as a single layer or a plurality of layers. In one embodiment, for example, the buffer film 420 may include or be formed of a polymer resin such as polyurethane, polycarbonate, polypropylene, or polyethylene, or may include or be formed of an elastic material such as a rubber, a urethane material, or a sponge formed by foaming an acrylic material. The buffer film 420 may be a cushion layer.

The heat radiation film 430 may be disposed under the buffer film 420. The heat radiation film 430 may include a first heat radiation layer 432 including graphite or carbon nanotubes and a second heat radiation layer 433 capable of blocking electromagnetic waves and including a metal thin film including or formed of copper, nickel, ferrite or silver having high thermal conductivity.

In a case where the vibration generator 510 is disposed on the heat radiation film 430 of the bottom cover 400, the first heat radiation layer of the heat radiation film 430 may be broken by the vibration of the vibration generator 510. Therefore, in an embodiment, the heat radiation film 430 may be removed in the area where the vibration generator 510 is disposed, and the vibration generator 510 may be attached to the lower surface of the buffer film 420. Alternatively, the buffer film 420 and the heat radiation film 430 may be removed, in the area where the vibration generator 510 is disposed, and the vibration generator 510 may be attached to the lower surface of the light blocking film 410.

A first surface of the vibration generator 510 may be disposed on the buffer film 402, and the flexible circuit board 520 may be disposed on a second surface of the vibration generator 510 opposite to the first surface thereof. The electrodes of the vibration generator 510 may be electrically connected to the pads of the pad portion of tan end portion of the flexible circuit board 520 on the second surface of the vibration generator 510.

FIG. 9 shows ultrasonic waves measured at twenty five positions (S1 to S25) of each of the front and back surfaces of the display device 10 while outputting the ultrasonic waves generated by vibrating the display panel 300 using the vibration generator 510. FIG. 9(*a*) shows twenty five positions (S1 to S25) of each of the front and back surfaces of the display device 10, where the ultrasonic waves are measured at the twenty five positions (S1 to S25), FIG. 9(*b*) shows the ultrasonic waves measured at the twenty five positions (S1 to S25) of the front surface of the display device 10, and FIG. 9(*c*) shows the ultrasonic waves measured at the twenty five positions (S1 to S25) of the back surface of the display device 10. As shown in FIG. 9, the ultrasonic waves are output not only to the front surface of the display device 10 and but also to the back surface of the display device 10. The ultrasonic waves output to the back surface of the display device 10 may be reflected by a user's body and detected by the microphone 750 of the display device 10. That is, the ultrasonic waves output to the back surface of the display device 10 as well as the ultrasonic waves output to the front surface of the display device 10 may be detected by the microphone 750. When the vibration generator 510 and the microphone 750 are used as a proximity sensor for detecting an object close to the front surface of the display device 10, the ultrasonic waves output to the back surface of the display device 10 may be noise.

In an embodiment, as described above, the ultrasonic waves output from the display device 10 may be detected by the microphone 750, but the invention is not limited thereto. In one embodiment, for example, the ultrasonic waves outputted from the display device 10 may be detected by an ultrasonic sensor or a micro speaker included in the display device 10. The ultrasonic sensor may be an ultrasonic fingerprint sensor capable of detecting ultrasonic waves.

In an embodiment of the invention, as shown in FIG. 6, a first ultrasonic wave absorbing film 531 may be disposed on the second surface of the vibration generator 510 to reduce the ultrasonic waves output to the back surface of the display device 10. The first ultrasonic wave absorbing film 531 may be attached to the second surface of the vibration generator 510 using an adhesive member such as a PSA.

The first ultrasonic wave absorbing film 531 may overlap the flexible circuit board 520 in the thickness direction (Z-axis direction) of the vibration generator 510. In an embodiment, as shown in FIG. 7, the first ultrasonic wave absorbing film 531 may be disposed to cover a portion of the flexible circuit board 520 disposed on the second surface of the vibration generator 510. Alternatively, the first ultrasonic wave absorbing film 531 may not overlap the flexible circuit board 520 in the thickness direction (Z-axis direction) of the vibration generator 510. In such an embodiment, the first ultrasonic wave absorbing film 531 may be disposed not to cover a portion of the flexible circuit board 520 disposed on the second surface of the vibration generator 510.

The first ultrasonic wave absorbing film 531 may include or be formed of a high attenuating material or a high-viscosity material for attenuating the ultrasonic waves generated by the vibration of the vibration generator 510. Alternatively, the first ultrasonic wave absorbing film 531 may have a multilayered structure in which each layer includes a low attenuating material or a low-viscosity material, to attenuate ultrasonic waves like a high attenuating material. The high attenuating material or high-viscosity material or the low attenuating material or low-viscosity material may include a material having attenuance (or attenuation) with respect to the ultrasonic waves having a frequency of 20 kilohertz (kHz) to 40 kHz, for example, silicon (Si).

Alternatively, the first ultrasonic wave absorbing film 531 may include a porous foam body and a sound absorbing film filled in the porous foam body and for absorbing ultrasonic waves. In an embodiment, a plurality of pores is defined in the porous foam body. Each of the plurality of pores may be connected to at least one of the adjacent pores. The size of the pores may not be constant, and may be irregular. The porosity of the porous foam body may be about 50% or greater. The diameter of the pores may be in a range of about 1 millimeter (mm) to about 10 mm, but not being limited thereto. The pores may be filled with a sound absorbing film. The sound absorbing film may include a material having a high attenuation coefficient. In one embodiment, for example, the sound absorbing film may include an epoxy resin. Alternatively, the sound absorbing film may include metal powder (for example, tungsten, copper, or aluminum) bonded by an epoxy resin, ceramic powder (for example, tungsten oxide or alumina), and carbon isotope powder (for example, graphite, graphene, nanotubes, diamond). Alternatively, the sound absorbing film may include rubber.

According to an embodiment, as shown in FIGS. 6 and 7, the first ultrasonic wave absorbing film 531 may absorb the ultrasonic waves generated by vibrating the display panel 300 using the vibration generator 510. In such an embodiment, where the vibration generator 510 and the microphone 750 are used as a proximity sensor for detecting an object close to the front surface of the display device 10, the detection accuracy of the proximity sensor may be increased.

Figure 10:
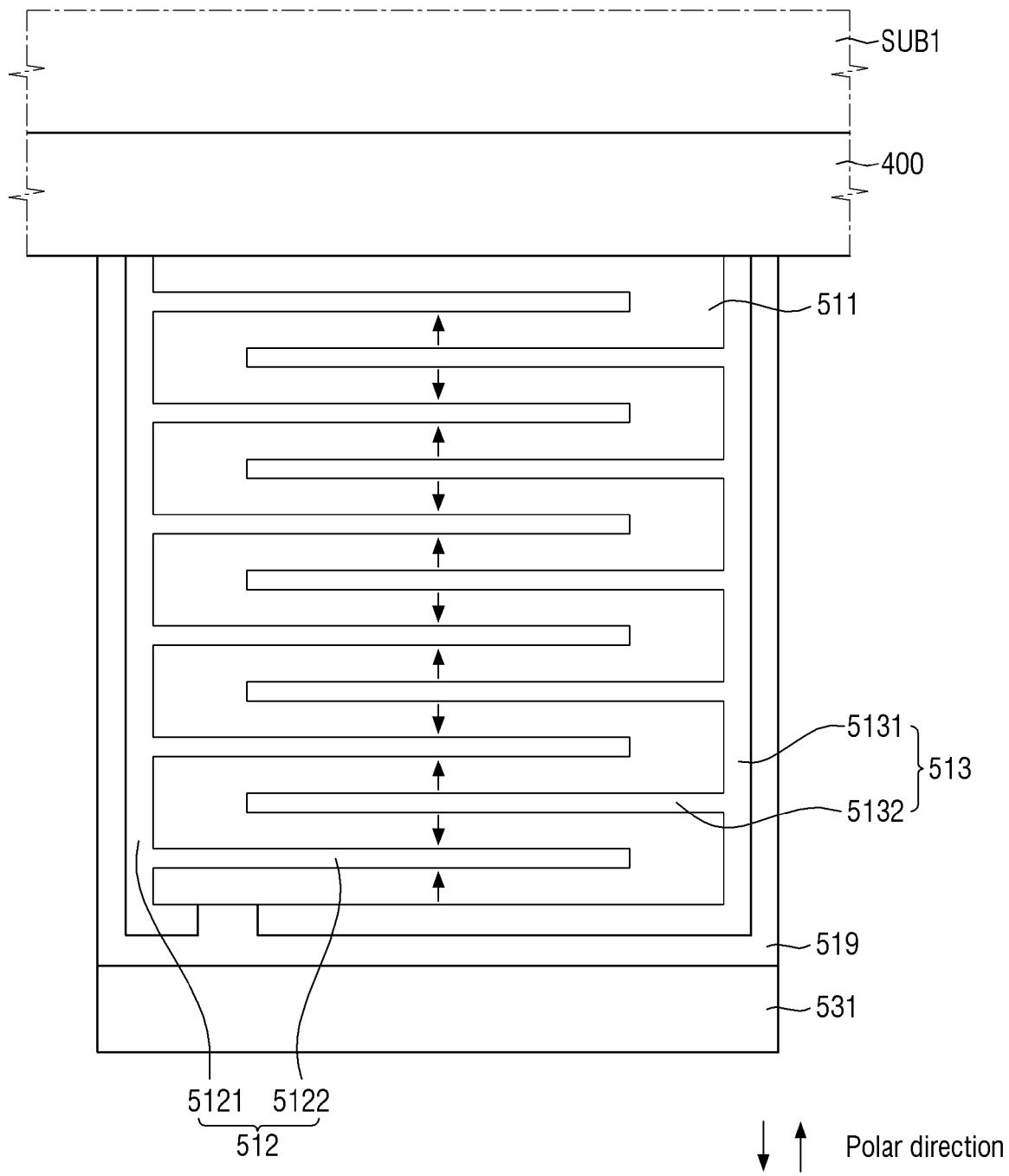
FIG. 10 is a cross-sectional view showing an embodiment of the vibration generator of FIG. 6.
Figure 11:
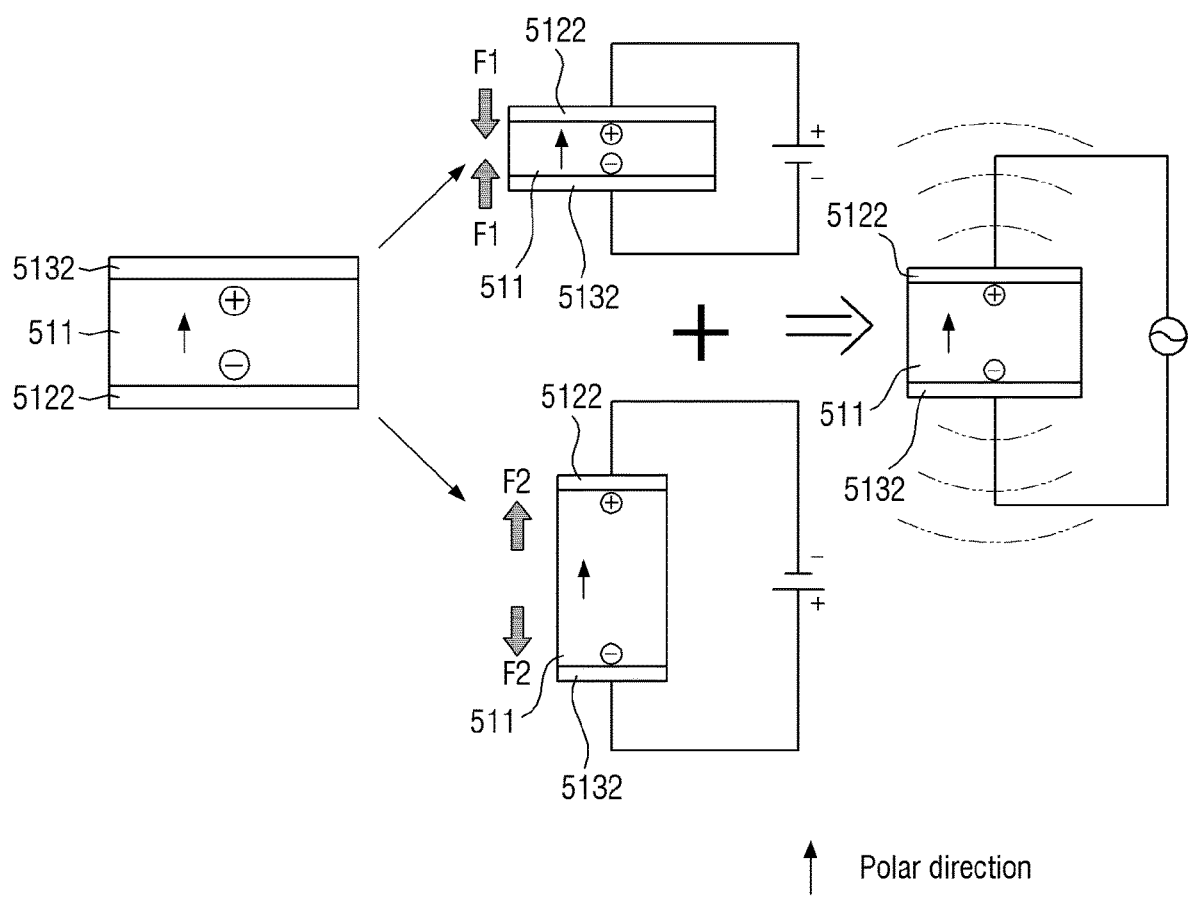
FIG. 11 is a schematic view showing a method of vibrating a vibration layer disposed between the first branch electrode and second branch electrode of the vibration generator.
Figure 12:
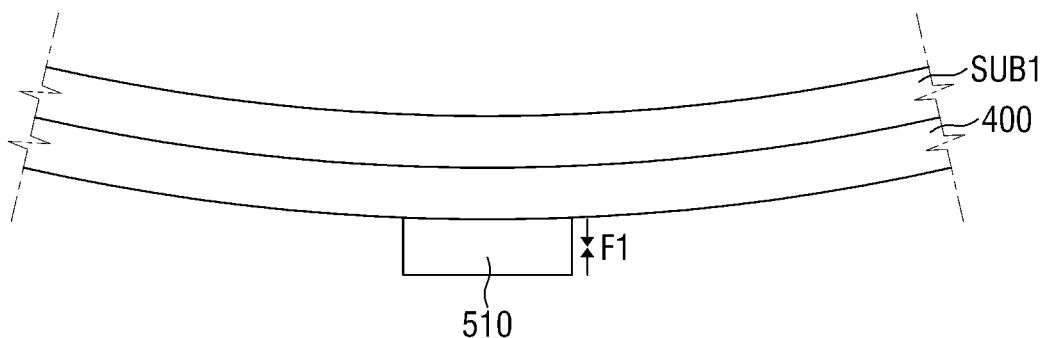
FIGS. 12 and 13 are schematic views showing a method of vibrating a display panel by using the vibration of the vibration generator.
Figure 13:
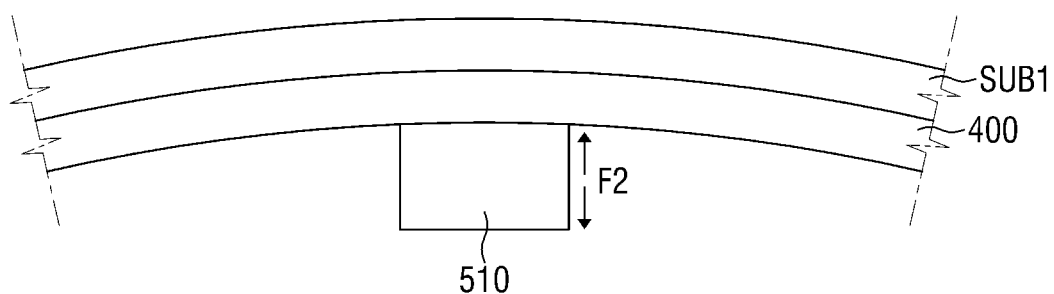

FIG. 10 is a cross-sectional view showing an embodiment of the vibration generator of FIG. 6, FIG. 11 is a schematic view showing a method of vibrating a vibration layer disposed between the first branch electrode and second branch electrode of the vibration generator, and FIGS. 12 and 13 are schematic views showing a method of vibrating a display panel by using the vibration of the vibration generator.

Referring to FIGS. 10 to 13, the vibration generator 510 may be a piezoelectric element or a piezoelectric actuator for vibrating the display panel 300 using a piezoelectric material that contracts or expands depending on the voltage applied thereto. The vibration generator 510 may include a vibration layer 511, a first electrode 512, and a second electrode 513. In FIGS. 10 to 13, the flexible circuit board 520 is omitted for convenience of illustration and description.

The first electrode 512 may include a first stem electrode 5121 and first branch electrodes 5122. The first stem electrode 5121 may be disposed on at least one side surface of the vibration layer 511 as shown in FIG. 10. Alternatively, the first stem electrode 5121 may be disposed to penetrate a part of the vibration layer 511. The first stem electrode 5121 may be disposed on the upper surface of the vibration layer 511. The first branch electrodes 5122 may be branched from the first stem electrode 5121. The first branch electrodes 5122 may be arranged in parallel to each other.

The second electrode 513 may include a second stem electrode 5131 and second branch electrodes 5132. The second electrode 513 may be disposed to be spaced apart from the first electrode 512, and the second electrode 513 may be electrically separated from the first electrode 512. The second stem electrode 5131 may be disposed on at least one side surface of the vibration layer 511. In an embodiment, the first stem electrode 5121 may be disposed on the first side surface of the vibration layer 511, and the second stem electrode 5131 may be disposed on the second side surface of the vibration layer 511. Alternatively, the second stem electrode 5131 may be disposed to penetrate a part of the vibration layer 511. The second stem electrode 5131 may be disposed on the upper surface of the vibration layer 511. The second branch electrodes 5132 may be branched from the second stem electrode 5131. The second branch electrodes 5132 may be arranged in parallel to each other.

The first branch electrodes 5122 and the second branch electrodes 5132 may be arranged in parallel to each other in the horizontal direction (X-axis direction or Y-axis direction). In an embodiment, the first branch electrodes 5122 and the second branch electrodes 5132 may be alternately arranged in the vertical direction (Z-axis direction). In such an embodiment, the first branch electrodes 5122 and the second branch electrodes 5132 may be arranged repeatedly in the vertical direction (Z-axis direction) in order of the first branch electrode 5122, the second branch electrode 5132, the first branch electrode 5122, and the second branch electrode 5132.

The first electrode 512 and the second electrode 513 may be connected to the pads of the flexible circuit board 520. The pads of the flexible circuit board 520 may be connected to portions of the first electrode 512 and second electrode 513 at a surface of the vibration generator 510.

The vibration layer 511 may be a piezoelectric element that is deformed in accordance with a driving voltage applied to the first electrode 512 and a driving voltage applied to the second electrode 513. In an embodiment, the vibration layer 511 may include or be made of at least one of a piezoelectric material such as poly vinylidene fluoride ("PVDF") or plumbum zirconate titanate ("PZT"), and an electroactive polymer.

Since the vibration layer 511 is formed at high temperature, the first electrode 512 and the second electrode 513 may be formed of silver (Ag) or an alloy of silver (Ag) and palladium (Pd), each having a high melting point. In an embodiment, where the first electrode 512 and the second electrode 513 are formed of an alloy of silver (Ag) and palladium (Pd) to increase the melting points of the first electrode 512 and the second electrode 513, the content of silver (Ag) may be higher than the content of palladium (Pd).

The vibration layer 511 may be disposed between the first branch electrodes 5122 and the second branch electrodes 5132. The vibration layer 511 contracts or expands according to the difference between a driving voltage applied to the first branch electrodes 5122 and a driving voltage applied to the second branch electrodes 5132.

In an embodiment, as shown in FIG. 11, the polarity direction of the vibration layer 511 disposed between the first branch electrode 5122 and the second branch electrode 5132 disposed under the first branch electrode 5122 may be an upward direction (↑), the vibration layer 511 has positive polarity in the upper region adjacent to the first branch electrode 5122, and has negative polarity in the lower region adjacent to the second branch electrode 5132. In such an embodiment, the polarity direction of the vibration layer 511 disposed between the second branch electrode 5132 and the first branch electrode 5122 disposed under the second branch electrode 5132 may be a downward direction (↓), the vibration layer 511 has negative polarity in the upper region adjacent to the second branch electrode 5132, and has positive polarity in the lower region adjacent to the first branch electrode 5122. The polarity direction of the vibration layer 511 may be determined by a poling process of applying an electric field to the vibration layer 511, or the first branch electrode 5122 and the second branch electrode 5132 thereof.

In an embodiment, as shown in FIG. 11, in a case where the polarity direction of the vibration layer 511 disposed between the first branch electrode 5122 and the second branch electrode 5132 disposed under the first branch electrode 5122 is the upward direction (↑), when a driving voltage having positive polarity is applied to the first branch electrode 5122, and a driving voltage having negative polarity is applied to the second branch electrode 5132, the vibration layer 511 may be contracted by a first force F1. The first force F1 may be a contraction force. In such an embodiment, when a driving voltage having negative polarity is applied to the first branch electrode 5122, and a driving voltage having positive polarity is applied to the second branch electrode 5132, the vibration layer 511 may be expanded by a second force F1. The second force F2 may be an extension force.

Similarly, in a case where the polarity direction of the vibration layer 511 disposed between the second branch electrode 5132 and the first branch electrode 5122 disposed under the second branch electrode 5132 is the downward direction (↓), when a driving voltage having positive polarity is applied to the second branch electrode 5132, and a driving voltage having negative polarity is applied to the first branch electrode 5122, the vibration layer 511 may be expanded by the extension force. The first force F1 may be a contraction force. Further, when a driving voltage having negative polarity is applied to the second branch electrode 5132, and a driving voltage having positive polarity is applied to the first branch electrode 5122, the vibration layer 511 may be contracted by the contraction force.

When the driving voltage applied to the first electrode 512 and the driving voltage applied to the second electrode 513 are alternately repeated in positive polarity and negative polarity, the vibration layer 511 repeats contraction and expansion as shown in FIGS. 12 and 13. Thus, the vibration generator 510 vibrates. Since the vibration generator 510 is disposed on one surface of the heat radiation film 130, when the vibration layer 511 of the vibration generator 510 contracts and expands, the display panel 300 is vibrated by force applied thereto by the vibration layer 511 in the third direction (Z-axis direction), which is a thickness direction of the display panel 300, as shown in FIGS. 12 and 13.

The first electrode 512 of the vibration generator 510 may receive a first first driving voltage from the vibration driving circuit 340 through the flexible circuit board 520 in a sound mode. The second electrode 513 of the vibration generator 510 may receive a second first driving voltage from the vibration driving circuit 340 through the flexible circuit board 520 in a sound mode. Since the vibration generator 510 may vibrate the display panel 300 depending on the first first driving voltage and the second first driving voltage, the display device 10 may output a sound in a sound mode.

The first electrode 512 of the vibration generator 510 may receive a first second driving voltage from the vibration driving circuit 340 through the flexible circuit board 520 in an ultrasonic mode. The second electrode 513 of the vibration generator 510 may receive a second second driving voltage from the vibration driving circuit 340 through the flexible circuit board 520 in an ultrasonic mode. Since the vibration generator 510 may vibrate the display panel 300 depending on the first second driving voltage and the second second driving voltage, the display device 10 may output ultrasonic waves in an ultrasonic mode.

In an embodiment, as shown in FIG. 10, a protective layer 519 may be disposed on the second surface and side surfaces of the vibration generator 510. The protective layer 519 may include or be formed of an insulating material. The protective layer 519 may be disposed on the first electrode 512, the second electrode 513, and a portion of the vibration layer 511 exposed through the first electrode 512 and the second electrode 513.

The protective layer 519 may be disposed to surround the first electrode 512, the second electrode 513 and the portion of the vibration layer 511 exposed through the first electrode 512 and the second electrode 513. Therefore, the vibration layer 511, first electrode 512, and second electrode 513 of the vibration generator 510 may be protected by the protective layer 519.

The first ultrasonic wave absorbing film 531 may be disposed on the lower surface of the protective layer 519. Therefore, the ultrasonic waves output to the back surface of the display device 10 may be absorbed by the first ultrasonic wave absorbing film 531.

According to an embodiment, as shown in FIGS. 10 to 13, the vibration generator 510 may vibrate the display panel 300 according to the first first driving voltage and the second first driving voltage in the sound mode to output a sound, and the vibration generator 510 may vibrate the display panel 300 according to the first second driving voltage and the second second driving voltage in the ultrasonic mode to output ultrasonic waves. Since the ultrasonic waves output to the back surface of the display device 10 may be absorbed by the first ultrasonic wave absorbing film 531 the amount of the ultrasonic waves toward the back surface of the display device 10 into the microphone 750 as noise may be reduced.

Figure 14:
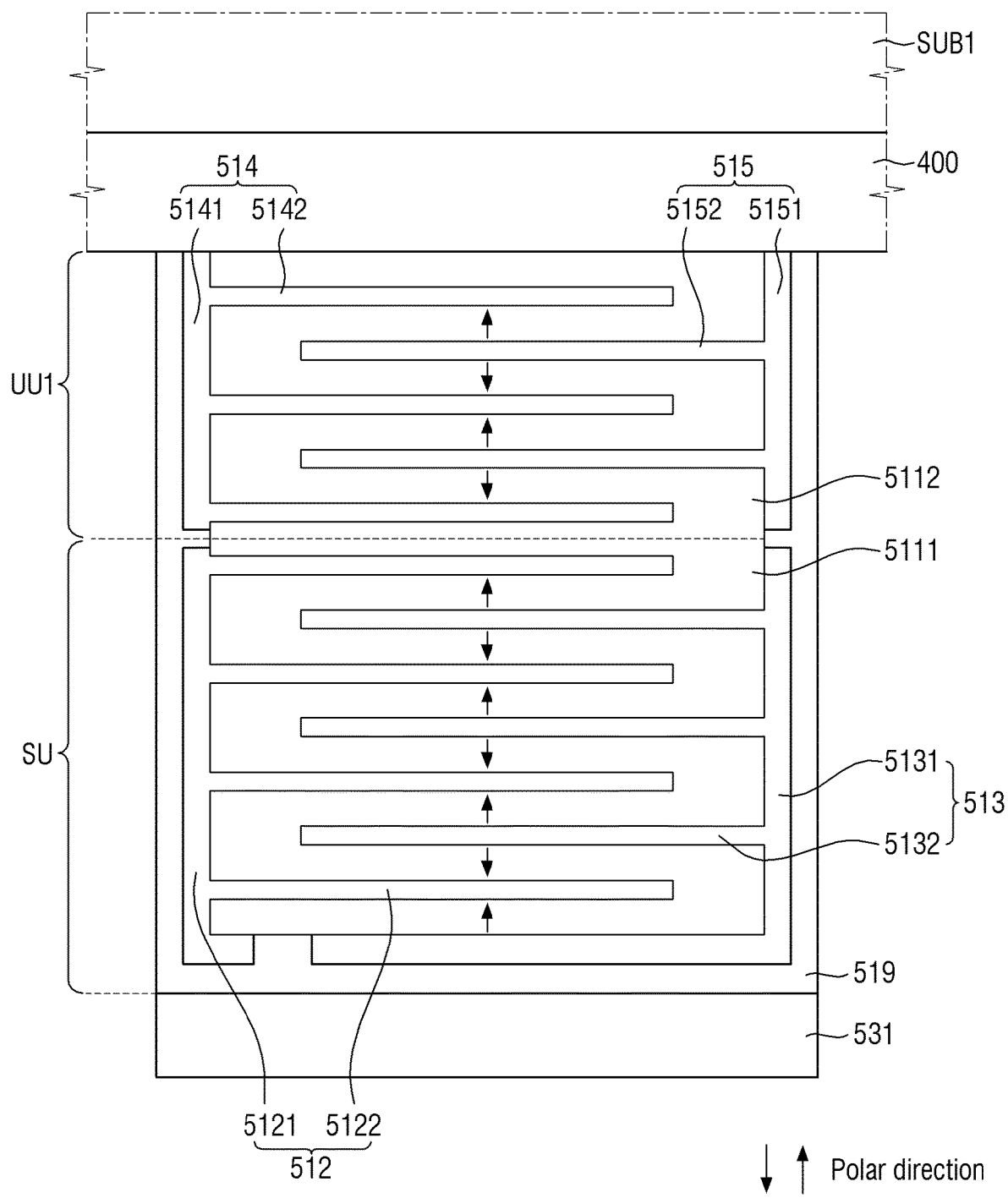
FIG. 14 is a cross-sectional view showing an alternative embodiment of the vibration generator of FIG. 6.

FIG. 14 is a cross-sectional view showing an alternative embodiment of the vibration generator of FIG. 6.

The embodiment shown in FIG. 14 is substantially the same as the embodiment shown in FIG. 10 except that the vibration generator 510 includes a sound output unit SU and a first ultrasonic wave output unit UU1.

Referring to FIG. 14, an embodiment of the vibration generator 510 includes a sound output unit SU and a first ultrasonic wave output unit UU1. The acoustic output unit SU and the first ultrasonic output unit UU1 may be disposed to overlap each other in the thickness direction (Z-axis direction) of the vibration generator 510. a surface of the sound output unit SU and a surface of the first ultrasonic wave output unit UU1 may be in direct contact with each other.

In an embodiment, as shown in FIG. 14, where the sound output unit SU is defined by a lower portion of the vibration generator 510 and the first ultrasonic wave output unit UU1 is defined by an upper portion of the vibration generator 510, the upper surface of the sound output unit SU and the lower surface of the first ultrasonic wave output unit UU1 may be in direct contact with each other. Alternatively, the sound output unit SU is defined by an upper portion of the vibration generator 510 and the first ultrasonic wave output unit UU1 is defined by a lower portion of the vibration generator 510, such that the lower surface of the sound output unit SU and the upper surface of the first ultrasonic wave output unit UU1 may be in direct contact with each other.

The sound output unit SU may include a first vibration layer 5111, a first electrode 512, and a second electrode 513. The first ultrasonic wave output unit UU1 may include a second vibration layer 5112, a third electrode 514, and a fourth electrode 515.

The first electrode 512 may include a first stem electrode 5121 and first branch electrodes 5122. The first stem electrode 5121 may be disposed on at least one side surface of the first vibration layer 5111 as shown in FIG. 14. Alternatively, the first stem electrode 5121 may be disposed through a part of the first vibration layer 5111. The first branch electrodes 5122 may be branched from the first stem electrode 5121. The first branch electrodes 5122 may be arranged in parallel to each other.

The second electrode 513 may include a second stem electrode 5131 and second branch electrodes 5132. The second electrode 513 may be disposed to be spaced apart from the first electrode 512. Thus, the second electrode 513 may be electrically separated from the first electrode 512. The second stem electrode 5131 may be disposed on at least one side surface of the first vibration layer 5111. In one embodiment, for example, the first stem electrode 5121 may be disposed on a first side surface of the first vibration layer 5111, and the second stem electrode 5131 may be disposed on a second side surface of the first vibration layer 5111. Alternatively, the second stem electrode 5131 may be disposed through a part of the first vibration layer 5111. The second branch electrodes 5132 may be branched from the second stem electrode 5131. The second branch electrodes 5132 may be arranged in parallel to each other.

The first stem electrode 5121 and the second stem electrode 5131 may extend in the thickness direction (Z-axis direction) of the vibration generator 510 and may be arranged in parallel to each other. The first branch electrodes 5122 and the second branch electrodes 5132 may extend in the horizontal direction (X-axis direction or Y-axis direction) and may be arranged in parallel to each other. In an embodiment, the first branch electrodes 5122 and the second branch electrodes 5132 may be alternately arranged in the vertical direction (Z-axis direction). In such an embodiment, the first branch electrodes 5122 and the second branch electrodes 5132 may be arranged repeatedly in the vertical direction (Z-axis direction) in the order of the first branch electrode 5122, the second branch electrode 5132, the first branch electrode 5122, and the second branch electrode 5132.

The third electrode 514 may include a third stem electrode 5141 and third branch electrodes 5142. The third stem electrode 5141 may be disposed on at least one side surface of the second vibration layer 5112 as shown in FIG. 14. Alternatively, the third stem electrode 5141 may be disposed through a part of the second vibration layer 5112. The third branch electrodes 5142 may be branched from the third stem electrode 5141. The third branch electrodes 5142 may be arranged in parallel to each other.

The fourth electrode 515 may include a fourth stem electrode 5151 and fourth branch electrodes 5152. The fourth electrode 515 may be disposed to be spaced apart from the third electrode 514. Thus, the fourth electrode 515 may be electrically separated from the third electrode 514. The fourth stem electrode 5151 may be disposed on at least one side surface of the second vibration layer 5112. In one embodiment, for example, the third stem electrode 5141 may be disposed on a first side surface of the second vibration layer 5112, and the third stem electrode 5141 may be disposed on a second side surface of the second vibration layer 5112. Alternatively, the fourth stem electrode 5151 may be disposed on the third side surface of the second vibration layer 5112, and the fourth stem electrode 5151 may be disposed on the fourth side surface of the second vibration layer 5112. In such an embodiment, the first stem electrode 5121, the second stem electrode 5131, the third stem electrode 5141, and the fourth stem electrode 5151 may be disposed on different side surfaces of the vibration layer 511 from each other. Alternatively, the fourth stem electrode 5151 may be disposed through a part of the second vibration layer 5112. The fourth branch electrodes 5152 may be branched from the fourth stem electrode 5151. The fourth branch electrodes 5152 may be arranged in parallel to each other.

The third branch electrodes 5142 and the fourth branch electrodes 5152 may be arranged in parallel to each other in the horizontal direction (X-axis direction or Y-axis direction). In an embodiment, the third branch electrodes 5142 and the fourth branch electrodes 5152 may be alternately arranged in the vertical direction (Z-axis direction). In such an embodiment, the third branch electrodes 5142 and the fourth branch electrodes 5152 may be arranged repeatedly in the vertical direction (Z-axis direction) in order of the third branch electrode 5142, the fourth branch electrode 5152, the third branch electrode 5142, and the fourth branch electrode 5152.

The first electrode 512, the second electrode 513, the third electrode 514 and the fourth electrode 515 may be connected to the pads of the flexible circuit board 520. The pads of the flexible circuit board 520 may be connected to portions of the first electrode 512, the second electrode 513, the third electrode 514 and the fourth electrode 515 at a surface of the vibration generator 510.

In an embodiment, the first vibration layer 5111 may be a piezoelectric element that is deformed based on a driving voltage applied to the first electrode 512 and a driving voltage applied to the second electrode 513, and the second vibration layer 5112 may be a piezoelectric element that is deformed based on a driving voltage applied to the third electrode 514 and a driving voltage applied to the fourth electrode 515. In such an embodiment, each of the first vibration layer 5111 and the second vibration layer 5112 may include or be made of any one of a piezoelectric material such as PVDF or PZT, and an electroactive polymer. The first vibration layer 5111 and the second vibration layer 5112 may be separately formed, and then may be attached to each other by an adhesive member such as a PSA. Alternatively, the first vibration layer 5111 and the second vibration layer 5112 may be integrally formed as a single unitary unit.

Since the first vibration layer 5111 and the second vibration layer 5112 are formed at high temperature, the first electrode 512, the second electrode 513, the third electrode 514 and the fourth electrode 515 may be formed of silver (Ag) or an alloy of silver (Ag) and palladium (Pd), each having a high melting point. In an embodiment, where the first electrode 512, the second electrode 513, the third electrode 514 and the fourth electrode 515 are formed of an alloy of silver (Ag) and palladium (Pd) to increase the melting points thereof, the content of silver (Ag) may be higher than the content of palladium (Pd).

The first vibration layer 5111 may contract or expand according to the driving voltages applied to the first electrode 512 and the second electrode 513. The second vibration layer 5112 may contract or expand according to the driving voltages applied to the third electrode 514 and the fourth electrode 515. Such contraction and expansion of the first vibration layer 5111 and the contraction and expansion of the second vibration layer 5112 are substantially the same as those described above with reference to FIGS. 11 to 13, and any repetitive detailed description thereof will be omitted.

The first electrode 512 of the vibration generator 510 may receive a first first driving voltage from the vibration driving circuit 340 through the flexible circuit board 520 in the sound mode. The second electrode 513 of the vibration generator 510 may receive a second first driving voltage from the vibration driving circuit 340 through the flexible circuit board 520 in the sound mode. Since the sound output unit SU of the vibration generator 510 may vibrate the display panel 300 according to the first first driving voltage and the second first driving voltage, the display device 10 may output a sound in the sound mode.

The third electrode 514 of the vibration generator 510 may receive a first second driving voltage from the vibration driving circuit 340 through the flexible circuit board 520 in the ultrasonic mode. The fourth electrode 515 of the vibration generator 510 may receive a second second driving voltage from the vibration driving circuit 340 through the flexible circuit board 520 in the ultrasonic mode. Since the first ultrasonic wave output unit UU1 of the vibration generator 510 may vibrate the display panel 300 according to the first second driving voltage and the second second driving voltage, the display device 10 may output ultrasonic waves in the ultrasonic mode.

Since the sound pressure level ("SPL") of the sound output from the sound output unit SU is proportional to the area of the sound output unit SU, the area of the sound output unit SU may be larger than the area of the first ultrasonic wave output unit UU1, and the area of the first vibration layer 5111 may be larger than the area of the second vibration layer 5112. In such an embodiment, since the number of branch electrodes may be proportional to the area of the vibration layer, the number of the first branch electrodes 5122 and the number of the second branch electrodes 5132 may be greater than the number of the third branch electrodes 5142 and the number of the fourth branch electrodes 5152, respectively. In such an embodiment, the length of the third stem electrode 5141 and the length of the fourth stem electrode 5151 in the thickness direction (Z-axis direction) of the vibration generator 510 may be shorter than the length of the first stem electrode 5121 and the length of the second stem electrode 5131 in the thickness direction (Z-axis direction) of the vibration generator 510, respectively.

The protective layer 519 may be disposed on a second surface and side surfaces of the vibration generator 510. The protective layer 519 may include or be formed of an insulating material. The protective layer 519 may be disposed on the first electrode 512, the second electrode 513, the third electrode 514, the fourth electrode 515, a portion of the first vibration layer 5111 exposed through the first electrode 512 and the second electrode 513, and a portion of the second vibration layer 5112 exposed through the third electrode 514 and the fourth electrode 515. Therefore, the first vibration layer 5111, second vibration layer 5112, first electrode 512, second electrode 513, third electrode 514 and fourth electrode 515 of the vibration generator 510 may be protected by the protective layer 519.

The first ultrasonic wave absorbing film 531 may be disposed on the lower surface of the protective layer 519. The first ultrasonic wave absorbing film 531 may be disposed to overlap the sound output unit SU and the first ultrasonic wave output unit UU1 in the thickness direction (Z-axis direction) of the vibration generator 510. Thus, when the ultrasonic waves generated by vibrating the display panel 300 using the first ultrasonic wave output unit UU1 of the vibration generator 510 travel toward the back surface of the display panel 300, such ultrasonic waves may be absorbed by the first ultrasonic wave absorbing film 531.

In an embodiment, where the protective layer 519 is omitted in the second surface of the vibration generator 510, the first vibration layer 5111, the first electrode 512 and the second electrode 513 may be protected by the first ultrasonic wave absorbing film 531, and thus the protective layer 519 disposed to overlap the first ultrasonic wave absorbing film 531 in the thickness direction (Z-axis direction) of the display panel 300 may be omitted.

According to an embodiment, as shown in FIG. 14, the vibration generator 510 may vibrate the display panel 300 based on the first first driving voltage and the second first driving voltage in the sound mode, thereby outputting a sound, and the vibration generator 510 may vibrate the display panel 300 based on the first second driving voltage and the second second driving voltage in the ultrasonic mode, thereby outputting ultrasonic waves. In such an embodiment, since the vibration generator 510 is divided into the sound output unit SU and the first ultrasonic wave output unit UU1, the sound output in the sound mode and the ultrasonic wave output in the ultrasonic mode may be effectively performed. In such an embodiment, the ultrasonic waves output to the back surface of the display device 10 may be absorbed by the first ultrasonic wave absorbing film 531, the amount of the ultrasonic waves toward the back surface of the display device 10 into the microphone 750 as noise may be reduced.

Figure 15:
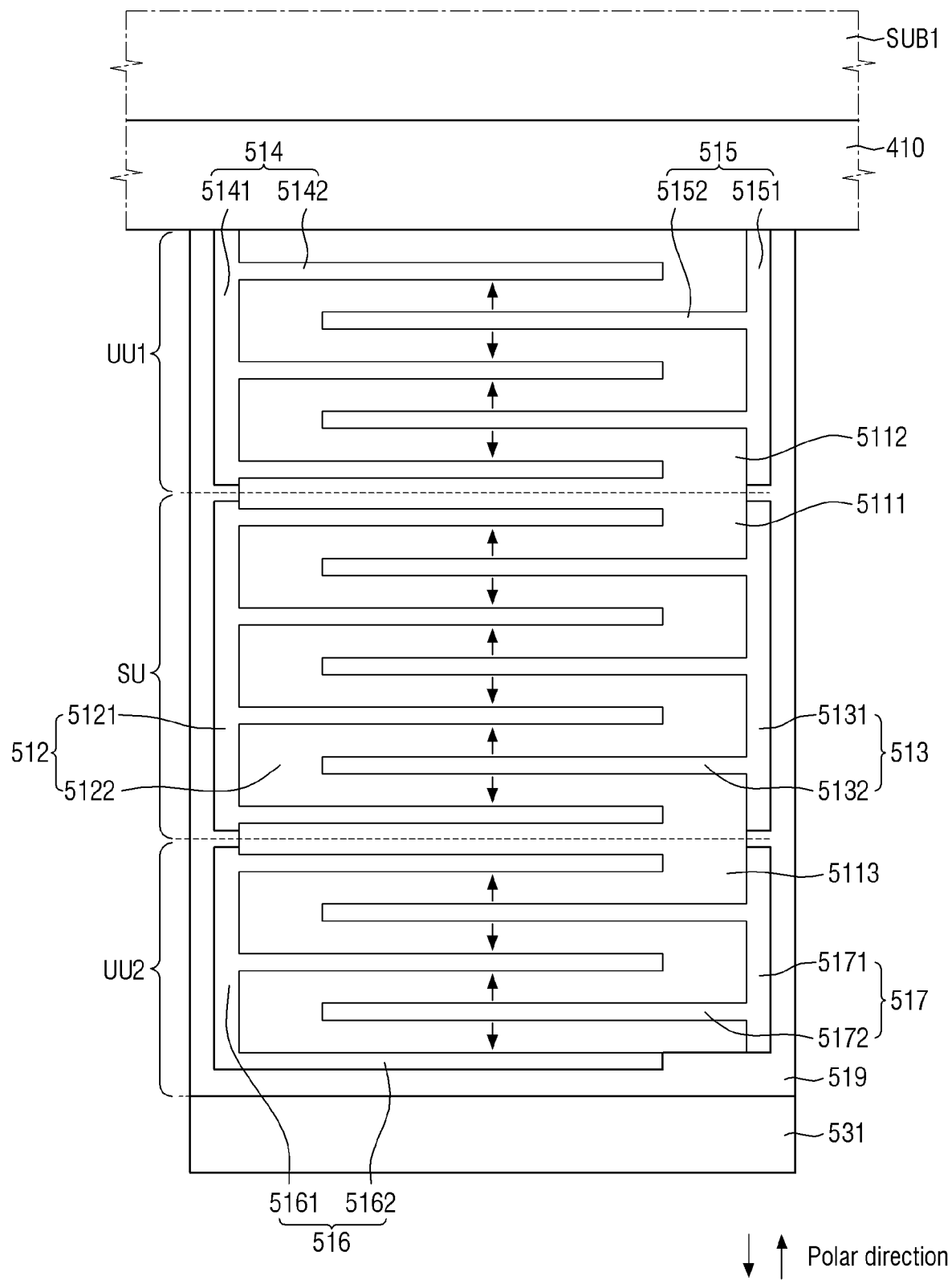
FIG. 15 is a cross-sectional view showing another alternative embodiment of the vibration generator of FIG. 6.

FIG. 15 is a cross-sectional view showing another alternative embodiment of the vibration generator of FIG. 6.

The embodiment shown in FIG. 15 is substantially the same as the embodiment shown in FIG. 14 except that the vibration generator 510 further includes a second ultrasonic wave output unit UU2. The same or like elements shown in FIG. 15 have been labeled with the same reference characters as used above to describe the embodiment of FIG. 14, and any repetitive detailed description thereof will hereinafter be omitted or simplified.

Referring to FIG. 15, the vibration generator 510 may include a sound output unit SU, a first ultrasonic wave output unit UU1, and a second ultrasonic wave output unit UU2. The sound output unit SU, the first ultrasonic wave output unit UU1 and the second ultrasonic wave output unit UU2 may be disposed to overlap each other in the thickness direction (Z-axis direction) of the vibration generator 510. A surface of the sound output unit SU and a surface of the first ultrasonic wave output unit UU1 may be in direct contact with each other, and an opposing surface of the sound output unit SU and a surface of the second ultrasonic wave output unit UU2 may be in direct contact with each other.

In an embodiment, as shown in FIG. 15, where the sound output unit SU is defined by a center portion of the vibration generator 510, the first ultrasonic wave output unit UU1 is defined by an upper portion of the vibration generator 510, and the second ultrasonic wave output unit UU2 is defined by a lower portion of the vibration generator 510, the upper surface of the sound output unit SU and the lower surface of the first ultrasonic wave output unit UU1 may in direct contact with each other, and the lower surface of the sound output unit SU and the upper surface of the second ultrasonic wave output unit UU2 may be in direct contact with each other.

The sound output unit SU may include a first vibration layer 5111, a first electrode 512, and a second electrode 513. The first ultrasonic wave output unit UU1 may include a second vibration layer 5112, a third electrode 514, and a fourth electrode 515. The second ultrasonic output unit UU2 may include a third vibration layer 5113, a fifth electrode 516, and a sixth electrode 517. Since the first vibration layer 5111, first electrode 512 and second electrode 513 of the sound output unit SU, and the second vibration layer 5112, third electrode 514 and fourth electrode 515 of the first ultrasonic wave output unit UU1 are substantially the same as those described above with reference to FIG. 14, any repetitive detailed descriptions thereof will be omitted.

In an embodiment, as shown in FIG. 15, the fifth electrode 516 may include a fifth stem electrode 5161 and fifth branch electrodes 5162. The fifth stem electrode 5161 may be disposed on at least one side surface of the third vibration layer 5113 as shown in FIG. 15. Alternatively, the fifth stem electrode 5161 may be disposed through a part of the third vibration layer 5113. The fifth branch electrodes 5162 may be branched from the fifth stem electrode 5161. The fifth branch electrodes 5162 may be arranged in parallel to each other.

The sixth electrode 517 may include a sixth stem electrode 5171 and sixth branch electrodes 5172. The sixth electrode 517 may be disposed to be spaced apart from the fifth electrode 516. Thus, the sixth electrode 517 may be electrically separated from the fifth electrode 516. The sixth stem electrode 5171 may be disposed on at least one side surface of the third vibration layer 5113. In one embodiment, for example, the fifth stem electrode 5161 may be disposed on the first side surface of the third vibration layer 5113, and the fifth stem electrode 5161 may be disposed on the second side surface of the third vibration layer 5113. Alternatively, the sixth stem electrode 5171 may be disposed on the third side surface of the third vibration layer 5113, and the sixth stem electrode 5171 may be disposed on the fourth side surface of the third vibration layer 5113. The third stem electrode 5141 and the fifth stem electrode 5161 may disposed on a same side surface as each other, and the fourth stem electrode 5151 and the sixth stem electrode 5171 may be disposed on a same side surface as each other. Alternatively, the sixth stem electrode 5171 may be disposed through a part of the third vibration layer 5113. The sixth branch electrodes 5172 may be branched from the sixth stem electrode 5171. The sixth branch electrodes 5172 may be arranged in parallel to each other.

The fifth branch electrodes 5162 and the sixth branch electrodes 5172 may be arranged in parallel to each other in the horizontal direction (X-axis direction or Y-axis direction). In an embodiment, the fifth branch electrodes 5162 and the sixth branch electrodes 5172 may be alternately arranged in the vertical direction (Z-axis direction). In such an embodiment, the fifth branch electrodes 5162 and the sixth branch electrodes 5172 may be arranged repeatedly in the vertical direction (Z-axis direction) in order of the fifth branch electrode 5162, the sixth branch electrode 5172, the fifth branch electrode 5162, and the sixth branch electrode 5172.

The first electrode 512, the second electrode 513, the third electrode 514, the fourth electrode 515, the fifth electrode 516, and the sixth electrode 517 may be connected to the pads of the flexible circuit board 520. The pads of the flexible circuit board 520 may be connected to portions of the first electrode 512, the second electrode 513, the third electrode 514, the fourth electrode 515, the fifth electrode 516, and the sixth electrode 517 at a surface of the vibration generator 510.

Since the first vibration layer 5111 and the second vibration layer 5112 are formed at high temperature, the first electrode 512, the second electrode 513, the third electrode 514, the fourth electrode 515, the fifth electrode 516, and the sixth electrode 517 may include or be formed of silver (Ag) or an alloy of silver (Ag) and palladium (Pd), each having a high melting point. When the first electrode 512, the second electrode 513, the third electrode 514, the fourth electrode 515, the fifth electrode 516, and the sixth electrode 517 are formed of an alloy of silver (Ag) and palladium (Pd) to increase the melting points thereof, the content of silver (Ag) may be higher than the content of palladium (Pd).

The first vibration layer 5111 may contract or expand according to the driving voltages applied to the first electrode 512 and the second electrode 513. The second vibration layer 5112 may contract or expand according to the driving voltages applied to the third electrode 514 and the fourth electrode 515. The third vibration layer 5113 may contract or expand according to the driving voltages applied to the fifth electrode 516 and the sixth electrode 517. Since the contraction and expansion of the first vibration layer 5111, the contraction and expansion of the second vibration layer 5112, and the contraction and expansion of the third vibration layer 5113 are substantially the same as those described above with reference to FIGS. 11 to 13, and any repetitive detailed description thereof will be omitted.

The first electrode 512 of the vibration generator 510 may receive a first first driving voltage from the vibration driving circuit 340 through the flexible circuit board 520 in the sound mode. The second electrode 513 of the vibration generator 510 may receive a second first driving voltage from the vibration driving circuit 340 through the flexible circuit board 520 in the sound mode. Since the sound output unit SU of the vibration generator 510 may vibrate the display panel 300 according to the first first driving voltage and the second first driving voltage, the display device 10 may output a sound in the sound mode.

The third electrode 514 and fifth electrode 516 of the vibration generator 510 may receive a first second driving voltage from the vibration driving circuit 340 through the flexible circuit board 520 in the ultrasonic mode. The fourth electrode 515 and sixth electrode 517 of the vibration generator 510 may receive a second second driving voltage from the vibration driving circuit 340 through the flexible circuit board 520 in the ultrasonic mode. Since the first ultrasonic wave output unit UU1 and second ultrasonic wave output unit UU2 of the vibration generator 510 may vibrate the display panel 300 according to the first second driving voltage and the second second driving voltage, the display device 10 may output ultrasonic waves in the ultrasonic mode.

Since the SPL of the sound output from the sound output unit SU is proportional to the area of the sound output unit SU, the area of the sound output unit SU may be larger than the area of each of the first ultrasonic wave output unit UU1 and the second ultrasonic wave output unit UU2. In such an embodiment, the area of the first vibration layer 5111 may be larger than the area of each of the second vibration layer 5112 and the third vibration layer 5113. In such an embodiment, since the number of branch electrodes may be proportional to the area of the vibration layer, the number of the first branch electrodes 5122 and the number of the second branch electrodes 5132 may be greater than the number of the third branch electrodes 5132, the number of the fourth branch electrodes 5152, the number of the fifth branch electrodes 5152, and the number of the sixth branch electrodes 5162, respectively. In such an embodiment, the length of the fifth stem electrode 5161 and the length of the sixth stem electrode 5171 in the thickness direction (Z-axis direction) of the vibration generator 510 may be shorter than the length of the first stem electrode 5121 and the length of the second stem electrode 5131 in the thickness direction (Z-axis direction) of the vibration generator 510, respectively.

The protective layer 519 may be disposed on the second surface and side surfaces of the vibration generator 510. The protective layer 519 may include or be formed of an insulating material. The protective layer 519 may be disposed on a portion of the first electrode 512, the second electrode 513, the third electrode 514, the fourth electrode 515, the fifth electrode 516, the sixth electrode 517, the first vibration layer 5111 exposed through the first electrode 512 and the second electrode 513, a portion of the second vibration layer 5112 exposed through the third electrode 514 and the fourth electrode 515, and a portion of the third vibration layer 5113 exposed through the fifth electrode 516 and the sixth electrode 517. The protective layer 519 may be disposed to surround the first electrode 512, the second electrode 513, the third electrode 514, the fourth electrode 515, the fifth electrode 516, the sixth electrode 517, the portion of the first vibration layer 5111 exposed through the first electrode 512 and the second electrode 513, the portion of the second vibration layer 5112 exposed through the third electrode 514 and the fourth electrode 515, and the portion of the third vibration layer 5113 exposed through the fifth electrode 516 and the sixth electrode 517. Therefore, the first vibration layer 5111, second vibration layer 5112, third vibration layer 5113, first electrode 512, second electrode 513, third electrode 514, fourth electrode 515, fifth electrode 516, and sixth electrode 517 of the vibration generator 510 may be protected by the protective layer 519.

The first ultrasonic wave absorbing film 531 may be disposed on the lower surface of the protective layer 519. The first ultrasonic wave absorbing film 531 may be disposed to overlap the sound output unit SU, the first ultrasonic wave output unit UU1, and the second ultrasonic wave output unit UU2 in the thickness direction (Z-axis direction) of the vibration generator 510. Thus, when the ultrasonic waves generated by vibrating the display panel 300 using the first ultrasonic wave output unit UU1 and the second ultrasonic wave output unit UU2 of the vibration generator 510 travel toward the back surface of the display panel 300, such ultrasonic waves may be absorbed by the first ultrasonic wave absorbing film 531.

In an embodiment, where the protective layer 519 is omitted in the second surface of the vibration generator 510, the third vibration layer 5113, the fifth electrode 516, and the sixth electrode 517 may be protected by the first ultrasonic wave absorbing film 531, and thus the protective layer 519 disposed to overlap the first ultrasonic wave absorbing film 531 in the thickness direction (Z-axis direction) of the display panel 300 may be omitted.

According to an embodiment, as shown in FIG. 15, the vibration generator 510 may vibrate the display panel 300 according to the first first driving voltage and the second first driving voltage in the sound mode, thereby outputting a sound, and the vibration generator 510 may vibrate the display panel 300 according to the first second driving voltage and the second second driving voltage in the ultrasonic mode, thereby outputting ultrasonic waves. In such an embodiment, since the vibration generator 510 is divided into the sound output unit SU, the first ultrasonic wave output unit UU1, and the second ultrasonic wave output unit UU2, the sound output in the sound mode and the ultrasonic wave output in the ultrasonic mode may be effectively performed. In such an embodiment, since the vibration generator 510 includes the two ultrasonic wave output units UU1 and UU2, ultrasonic waves may be output with a high SPL as compared to a case where the vibration generator 510 includes a single ultrasonic wave output unit. In such an embodiment, since the ultrasonic waves output to the back surface of the display device 10 may be absorbed by the first ultrasonic wave absorbing film 531, the amount of the ultrasonic waves toward the back surface of the display device 10 into the microphone 750 as noise may be reduced.

Figure 16:
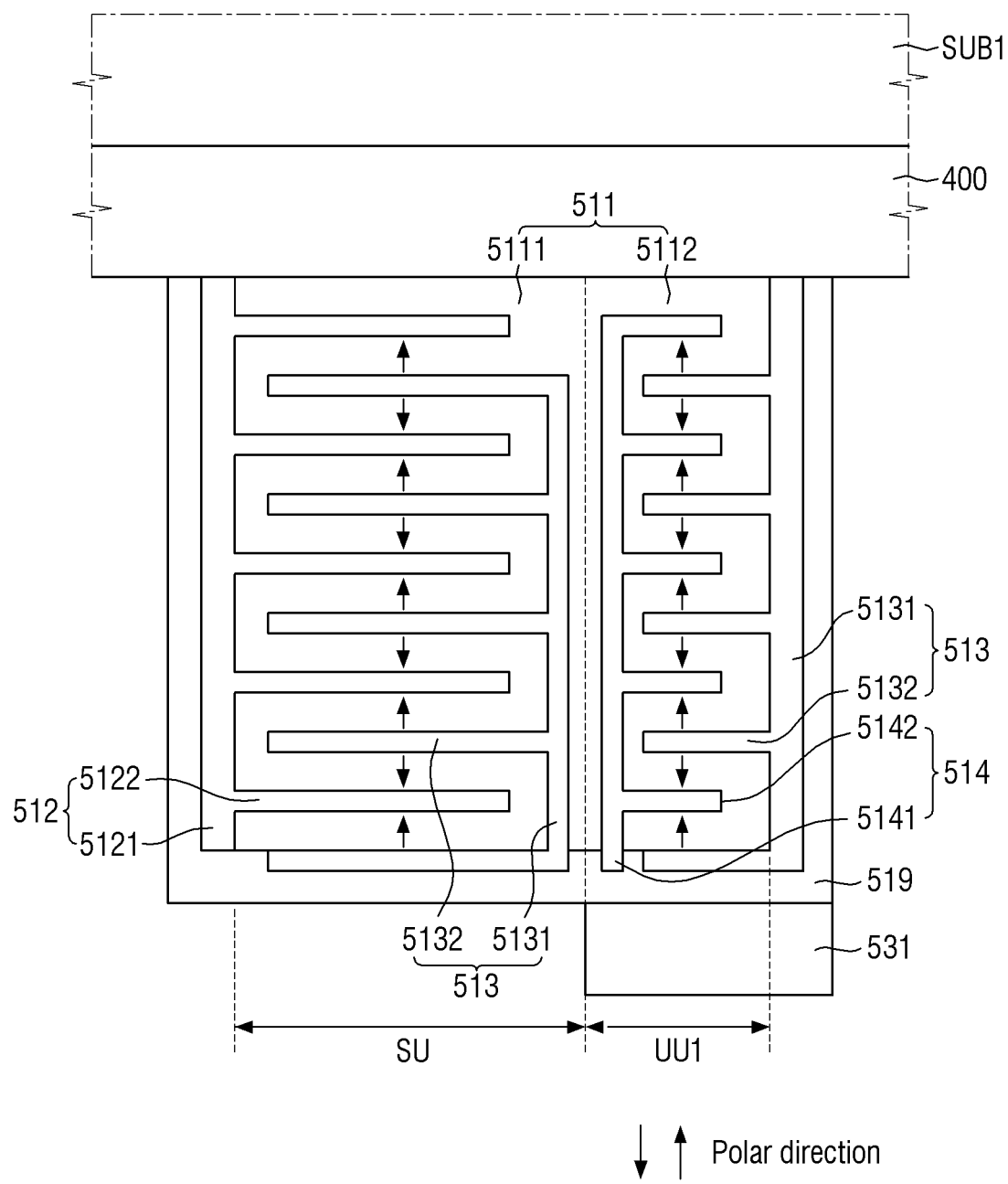
FIG. 16 is a cross-sectional view showing another alternative embodiment of the vibration generator of FIG. 6.

FIG. 16 is a cross-sectional view showing another alternative embodiment of the vibration generator of FIG. 6.

The embodiment shown in FIG. 16 is substantially the same as the embodiment shown in FIG. 14 except that a sound output unit SU and a first ultrasonic wave output unit UU1 are arranged to overlap each other in the first direction (X-axis direction). The same or like elements shown in FIG. 16 have been labeled with the same reference characters as used above to describe the embodiment of FIG. 14, and any repetitive detailed description thereof will hereinafter be omitted or simplified.

Referring to FIG. 16, the vibration generator 510 may include a sound output unit SU and a first ultrasonic wave output unit UU1. The sound output unit SU and the first ultrasonic wave output unit UU1 may be disposed to overlap each other in the first direction (X-axis direction). A surface of the sound output unit SU and a surface of the first ultrasonic wave output unit UU1 may be in direct contact with each other. In such an embodiment, as shown in FIG. 16, the sound output unit SU is defined by a left side portion of the vibration generator 510 and the first ultrasonic wave output unit UU1 is defined by a right side portion of the vibration generator 510, and the right side surface of the sound output unit SU and the left side surface of the first ultrasonic wave output unit UU1 may be in direct contact with each other. Alternatively, the sound output unit SU is defined by a right side portion of the vibration generator 510 and the first ultrasonic wave output unit UU1 is defined by a left side portion of the vibration generator 510, and the left side surface of the sound output unit SU and the right side surface of the first ultrasonic wave output unit UU1 may be in direct contact with each other.

The sound output unit SU may include a first vibration layer 5111, a first electrode 512, and a second electrode 513. The first ultrasonic wave output unit UU1 may include a second vibration layer 5112, a third electrode 514, and a fourth electrode 515.

In such an embodiment, the first vibration layer 5111, first electrode 512, and second electrode 513 of the sound output unit SU are substantially the same as those described above with reference to FIG. 14, except that the second stem electrode 5131 of the second electrode 513 is disposed to penetrate a part of the first vibration layer 5111 in the thickness direction (Z-axis direction) of the vibration generator 510 because one side surface of the first vibration layer 5111 and one side surface of the second vibration layer 5112 are in direct contact with each other. Therefore, any repetitive detailed descriptions thereof will be omitted.

In such an embodiment, the second vibration layer 5112, third electrode 514, and fourth electrode 515 of the first ultrasonic wave output unit UU1 are substantially the same as those described above with reference to FIG. 14 except that the fourth branch electrode 5152 of the fourth electrode 515 is disposed through a part of the second vibration layer 5112 in the thickness direction (Z-axis direction) of the vibration generator 510 because one side surface of the first vibration layer 5111 and one side surface of the second vibration layer 5112 are in direct contact with each other. Therefore, any repetitive detailed descriptions thereof will be omitted.

Since the SPL of the sound output from the sound output unit SU is proportional to the area of the sound output unit SU, the area of the sound output unit SU may be larger than the area of the first ultrasonic wave output unit UU1, and the area of the first vibration layer 5111 may be larger than the area of the second vibration layer 5112. In such an embodiment, the length of the first branch electrode 5122 of the first electrode 512 and the length of the second branch electrode 5132 of the second electrode 513 in the first direction (X-axis direction) may be longer than the length of the third branch electrode 5142 of the third electrode 514 and the length of the fourth branch electrode 5152 of the fourth electrode 515 in the first direction (X-axis direction), respectively.

The first ultrasonic wave absorbing film 531 may be disposed on the lower surface of the protective layer 519. The first ultrasonic wave absorbing film 531 may be disposed to overlap the first ultrasonic wave output unit UU1 in the thickness direction (Z-axis direction) of the vibration generator 510. The first ultrasonic wave absorbing film 531 may not overlap the sound output unit SU in the thickness direction (Z-axis direction) of the vibration generator 510. Thus, when the ultrasonic waves generated by vibrating the display panel 300 using the first ultrasonic wave output unit UU1 of the vibration generator 510 travel toward the back surface of the display panel 300, such ultrasonic waves may be absorbed by the first ultrasonic wave absorbing film 531.

In an embodiment, where the protective layer 519 is omitted in the second surface of the vibration generator 510, the second vibration layer 5112, the third electrode 514, and the fourth electrode 515 may be protected by the first ultrasonic wave absorbing film 531, and thus the protective layer 519 disposed to overlap the first ultrasonic wave absorbing film 531 in the thickness direction (Z-axis direction) of the display panel 300 may be omitted.

According to an embodiment, as shown in FIG. 16, the vibration generator 510 may vibrate the display panel 300 according to the first first driving voltage and the second first driving voltage in the sound mode, thereby outputting a sound, and the vibration generator 510 may vibrate the display panel 300 according to the first second driving voltage and the second second driving voltage in the ultrasonic mode, thereby outputting ultrasonic waves. In such an embodiment, since the vibration generator 510 is divided into the sound output unit SU and the first ultrasonic wave output unit UU1, the sound output in the sound mode and the ultrasonic wave output in the ultrasonic mode may be effectively performed. In such an embodiment, since the ultrasonic waves output to the back surface of the display device 10 may be absorbed by the first ultrasonic wave absorbing film 531, the amount of the ultrasonic waves toward the back surface of the display device 10 into the microphone 750 as noise may be reduced.

Figure 17:
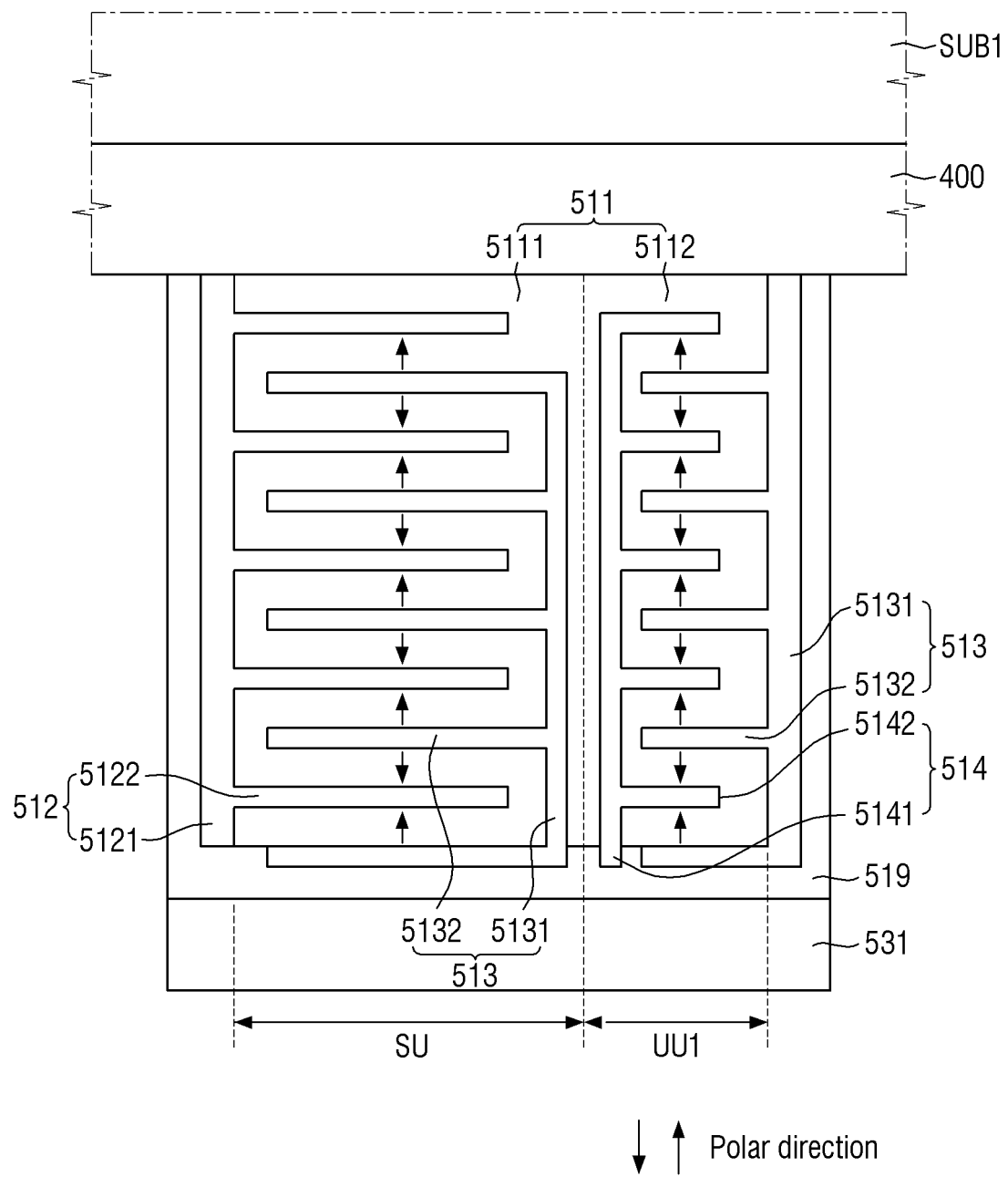
FIG. 17 is a cross-sectional view showing another alternative embodiment of the vibration generator of FIG. 6.

FIG. 17 is a cross-sectional view showing another alternative embodiment of the vibration generator of FIG. 6.

The embodiment shown in FIG. 17 is substantially the same as the embodiment shown in FIG. 16 except that the first ultrasonic wave absorbing film 531 overlaps the sound output unit SU in the thickness direction (Z-axis direction) of the vibration generator 510. The same or like elements shown in FIG. 17 have been labeled with the same reference characters as used above to describe the embodiment of FIG. 16, and any repetitive detailed description thereof will hereinafter be omitted.

Figure 18:
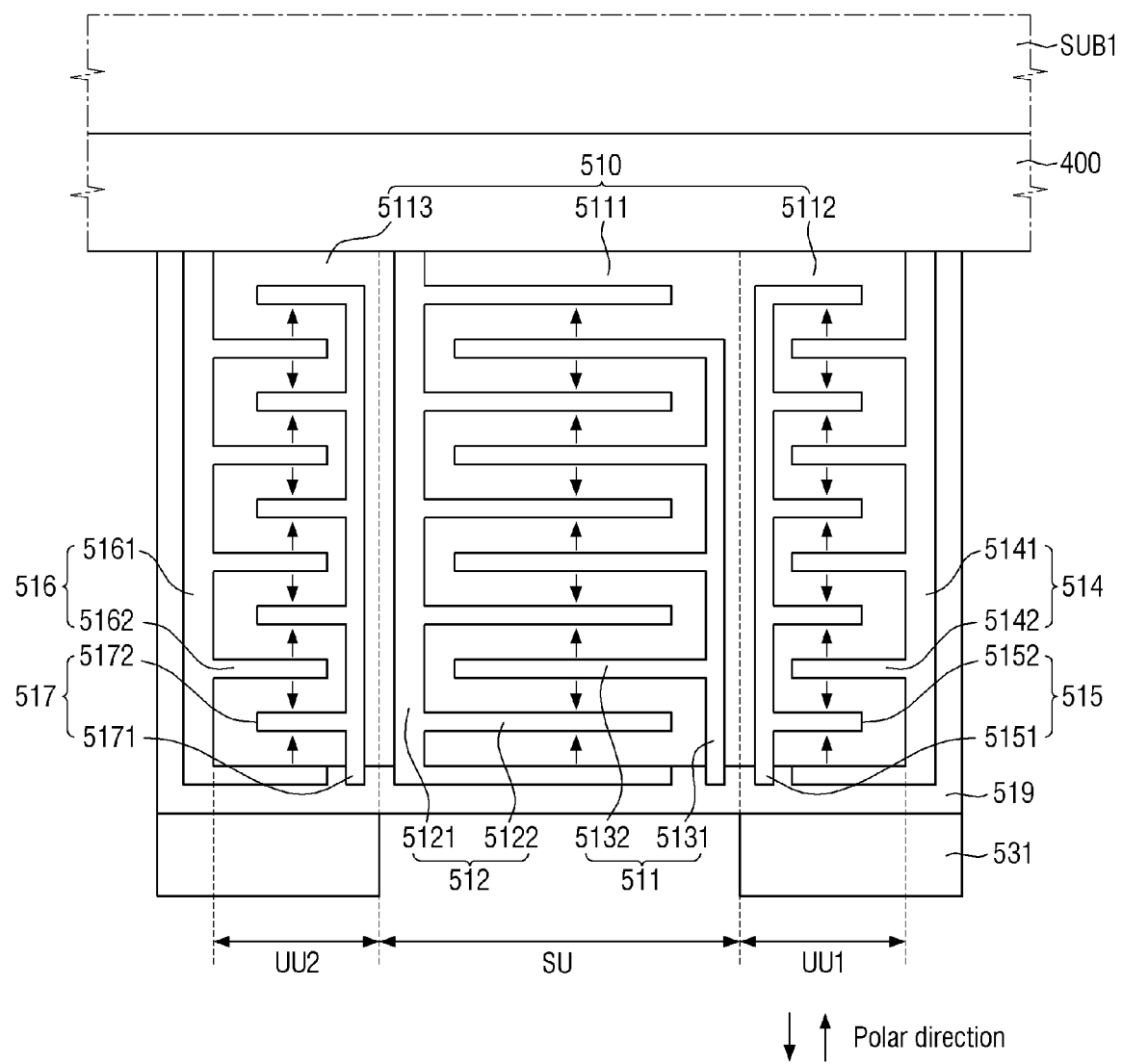
FIG. 18 is a cross-sectional view showing another alternative embodiment of the vibration generator of FIG. 6.

FIG. 18 is a cross-sectional view showing another alternative embodiment of the vibration generator of FIG. 6.

The embodiment shown in FIG. 18 is substantially the same as the embodiment shown in FIG. 15 except that a sound output unit SU, a first ultrasonic wave output unit UU1, and a second ultrasonic wave output unit UU2 are arranged to overlap each other in the first direction (X-axis direction). The same or like elements shown in FIG. 18 have been labeled with the same reference characters as used above to describe the embodiment of FIG. 15, and any repetitive detailed description thereof will hereinafter be omitted or simplified.

Referring to FIG. 18, the vibration generator 510 may include a sound output unit SU, a first ultrasonic wave output unit UU1, and a second ultrasonic wave output unit UU2. The sound output unit SU, the first ultrasonic wave output unit UU1, and the second ultrasonic wave output unit UU2 may be disposed to overlap each other in the first direction (X-axis direction). A surface of the sound output unit SU and a surface of the first ultrasonic wave output unit UU1 may be in direct contact with each other, and another surface of the sound output unit SU and a surface of the second ultrasonic wave output unit UU2 may be in direct contact with each other. In such an embodiment, as shown in FIG. 18, the sound output unit SU is defined by a center portion of the vibration generator 510, the first ultrasonic wave output unit UU1 is defined by a right side portion of the vibration generator 510, and the second ultrasonic wave output unit UU2 is defined by a left side portion of the vibration generator 510, the right side surface of the sound output unit SU and the left side surface of the first ultrasonic wave output unit UU1 may be in direct contact with each other, and the left side surface of the sound output unit SU and the right side surface of the second ultrasonic wave output unit UU2 may be in direct contact with each other.

The sound output unit SU may include a first vibration layer 5111, a first electrode 512, and a second electrode 513. The first ultrasonic wave output unit UU1 may include a second vibration layer 5112, a third electrode 514, and a fourth electrode 515. The second ultrasonic wave output unit UU2 may include a third vibration layer 5113, a fifth electrode 516, and a sixth electrode 517.

In such an embodiment, the first vibration layer 5111, first electrode 512, and second electrode 513 of the sound output unit SU, and the second vibration layer 5112, third electrode 514, and fourth electrode 515 of the first ultrasonic wave output unit UU1 are substantially the same as those described above with reference to FIG. 16, and any repetitive detailed descriptions thereof will be omitted.

In such an embodiment, the third vibration layer 5113, fifth electrode 516, and sixth electrode 517 of the second ultrasonic wave output unit UU2 are substantially the same as those described above with respect to FIG. 15 except that the sixth branch electrode 5172 of the sixth electrode 517 is disposed through a part of the third vibration layer 5113 in the thickness direction (Z-axis direction) of the vibration generator 510 because the other side surface of the first vibration layer 5111 and the other side surface of the third vibration layer 5113 are in direct contact with each other. Therefore, any repetitive detailed descriptions thereof will be omitted.

In an embodiment, since the SPL of the sound output from the sound output unit SU is proportional to the area of the sound output unit SU, the area of the sound output unit SU may be larger than the area of each of the first ultrasonic wave output unit UU1 and the second ultrasonic wave output unit UU2. Further, the area of the first vibration layer 5111 may be larger than the area of each of the second vibration layer 5112 and the third vibration layer 5113. In such an embodiment, the length of the first branch electrode 5122 of the first electrode 512 and the length of the second branch electrode 5132 of the second electrode 513 in the first direction (X-axis direction) may be longer than the length of the third branch electrode 5142 of the third electrode 514 and the length of the fourth branch electrode 5152 of the fourth electrode 515 in the first direction (X-axis direction), respectively. In such an embodiment, the length of the first branch electrode 5122 of the first electrode 512 and the length of the second branch electrode 5132 of the second electrode 513 in the first direction (X-axis direction) may be longer than the length of the fifth branch electrode 5162 of the fifth electrode 516 and the length of the sixth branch electrode 5172 of the sixth electrode 517 in the first direction (X-axis direction), respectively.

In such an embodiment, as shown in FIG. 18, the first ultrasonic wave absorbing film 531 may be disposed on the lower surface of the protective layer 519. The first ultrasonic wave absorbing film 531 may be disposed to overlap the first ultrasonic wave output unit UU1 and the second ultrasonic wave output unit UU2 in the thickness direction (Z-axis direction) of the vibration generator 510. The first ultrasonic wave absorbing film 531 may not overlap the sound output unit SU in the thickness direction (Z-axis direction) of the vibration generator 510. Thus, when the ultrasonic waves generated by vibrating the display panel 300 using the first ultrasonic wave output unit UU1 and second ultrasonic wave output unit UU2 of the vibration generator 510 travel toward the back surface of the display panel 300, such ultrasonic waves may be absorbed by the first ultrasonic wave absorbing film 531.

In an embodiment, where the protective layer 519 is omitted in the second surface of the vibration generator 510, the second vibration layer 5112, the third vibration layer 5113, the third electrode 514, the fourth electrode 515, the fifth electrode 516, and the sixth electrode 517 may be protected by the first ultrasonic wave absorbing film 531, and thus the protective layer 519 disposed to overlap the first ultrasonic wave absorbing film 531 in the thickness direction (Z-axis direction) of the display panel 300 may be omitted.

According to an embodiment, as shown in FIG. 18, the vibration generator 510 may vibrate the display panel 300 according to the first first driving voltage and the second first driving voltage in the sound mode, thereby outputting a sound, and the vibration generator 510 may vibrate the display panel 300 according to the first second driving voltage and the second second driving voltage in the ultrasonic mode, thereby outputting ultrasonic waves. In such an embodiment, since the vibration generator 510 is divided into the sound output unit SU, the first ultrasonic wave output unit UU1, and the second ultrasonic wave output unit UU2, the sound output in the sound mode and the ultrasonic wave output in the ultrasonic mode may be effectively performed. In such an embodiment, since the vibration generator 510 includes the two ultrasonic wave output units UU1 and UU2, ultrasonic waves of a high SPL may be output as compared with when the vibration generator 510 includes one ultrasonic wave output unit. Moreover, since the ultrasonic waves output to the back surface of the display device 10 may be absorbed by the first ultrasonic wave absorbing film 531, the amount of the ultrasonic waves toward the back surface of the display device 10 into the microphone 750 as noise may be reduced.

Figure 19:
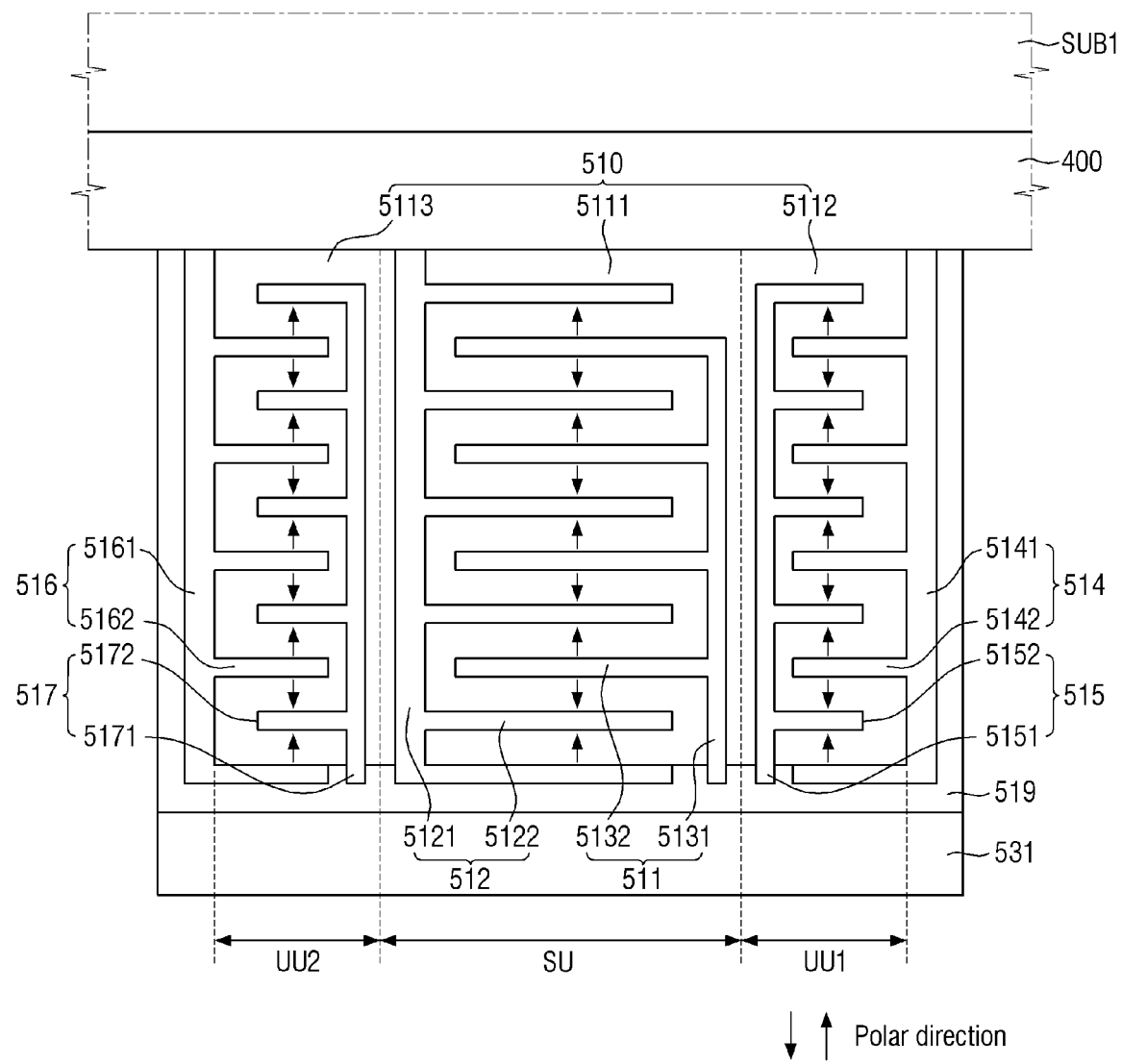
FIG. 19 is a cross-sectional view showing another alternative embodiment of the vibration generator of FIG. 6.

FIG. 19 is a cross-sectional view showing another alternative embodiment of the vibration generator of FIG. 6.

The embodiment shown in FIG. 19 is substantially the same as the embodiment shown in FIG. 18 except that the first ultrasonic wave absorbing film 531 overlaps the sound output unit SU in the thickness direction (Z-axis direction) of the vibration generator 510. The same or like elements shown in FIG. 19 have been labeled with the same reference characters as used above to describe the embodiment of FIG. 18, and any repetitive detailed description thereof will hereinafter be omitted.

Figure 20:
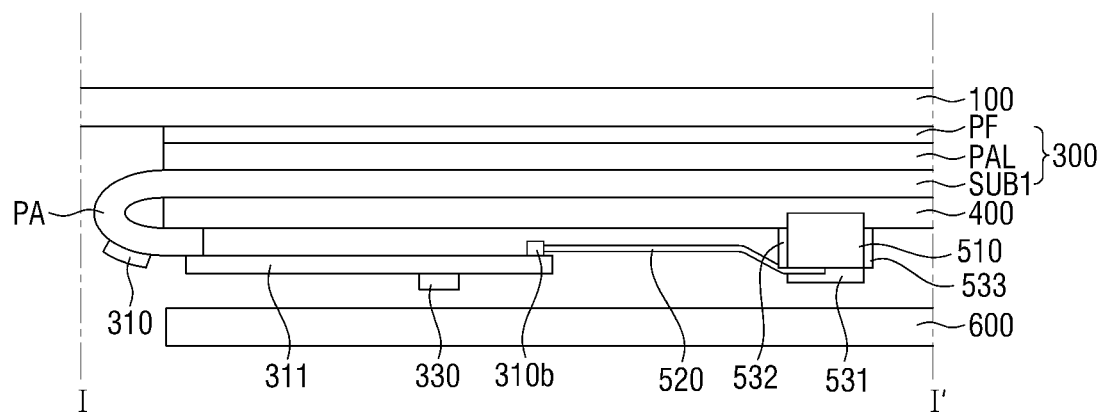
FIG. 20 is a cross-sectional view taken along line I-I' of FIG. 3 according to an alternative embodiment.

FIG. 20 is a cross-sectional view taken along line I-I' of FIG. 3 according to an alternative embodiment.

The embodiment shown in FIG. 20 is substantially the same as the embodiment shown in FIG. 6 except that the display device 10 further includes a second ultrasonic wave absorbing film 532 and a third ultrasonic wave absorbing film 533. The same or like elements shown in FIG. 20 have been labeled with the same reference characters as used above to describe the embodiment of FIG. 6, and any repetitive detailed description thereof will hereinafter be omitted or simplified.

Referring to FIG. 20, in an embodiment, a second ultrasonic wave absorbing film 532 may be disposed on the first side surface of the vibration generator 510, and a third ultrasonic wave absorbing film 533 may be disposed on the second side surface of the vibration generator 510 to reduce the ultrasonic waves output to the back surface of the display device 10. The second ultrasonic wave absorbing film 532 may be attached to the first side surface of the vibration generator 510 using an adhesive member such as a PSA. The third ultrasonic wave absorbing film 533 may be attached to the second side surface of the vibration generator 510 using an adhesive member such as a PSA. The second ultrasonic wave absorbing film 532 and the third ultrasonic wave absorbing film 533 may be arranged to surround all the side surfaces of the vibration generator 510.

In an embodiment, as described above with reference to FIG. 9, the ultrasonic waves generated by vibrating the display panel 300 using the vibration generator 510 may be detected over the entire back surface of the display panel 300. Therefore, when the second ultrasonic wave absorbing film 532 and the third ultrasonic wave absorbing film 533 are disposed on the side surfaces of the vibration generator 510, the ultrasonic waves output to the back surface of the display device 10 may be further reduced.

In such an embodiment, when the ultrasonic waves generated by vibrating the display panel 300 using the vibration generator 510 travel toward the back surface of the display panel 300, such ultrasonic waves may be absorbed by the first ultrasonic wave absorbing film 531, the second ultrasonic wave absorbing film 532 and the third ultrasonic wave absorbing film 533.

In such an embodiment, the second ultrasonic wave absorbing film 532 and the third ultrasonic wave absorbing film 533 may be substantially the same as the first ultrasonic wave absorbing film 531 described above with reference to FIG. 6, and any repetitive detailed descriptions of the second ultrasonic wave absorbing film 532 and the third ultrasonic wave absorbing film 533 will be omitted.

According to an embodiment, as shown in FIG. 20, the first ultrasonic wave absorbing film 531, the second ultrasonic wave absorbing film 532 and the third ultrasonic wave absorbing film 533 may absorb the ultrasonic waves generated by vibrating the display panel 300 using the vibration generator 510. Therefore, when the vibration generator 510 and the microphone 750 are used as a proximity sensor for detecting an object close to the front surface of the display device, the detection accuracy of the proximity sensor may be increased.

Figure 21:
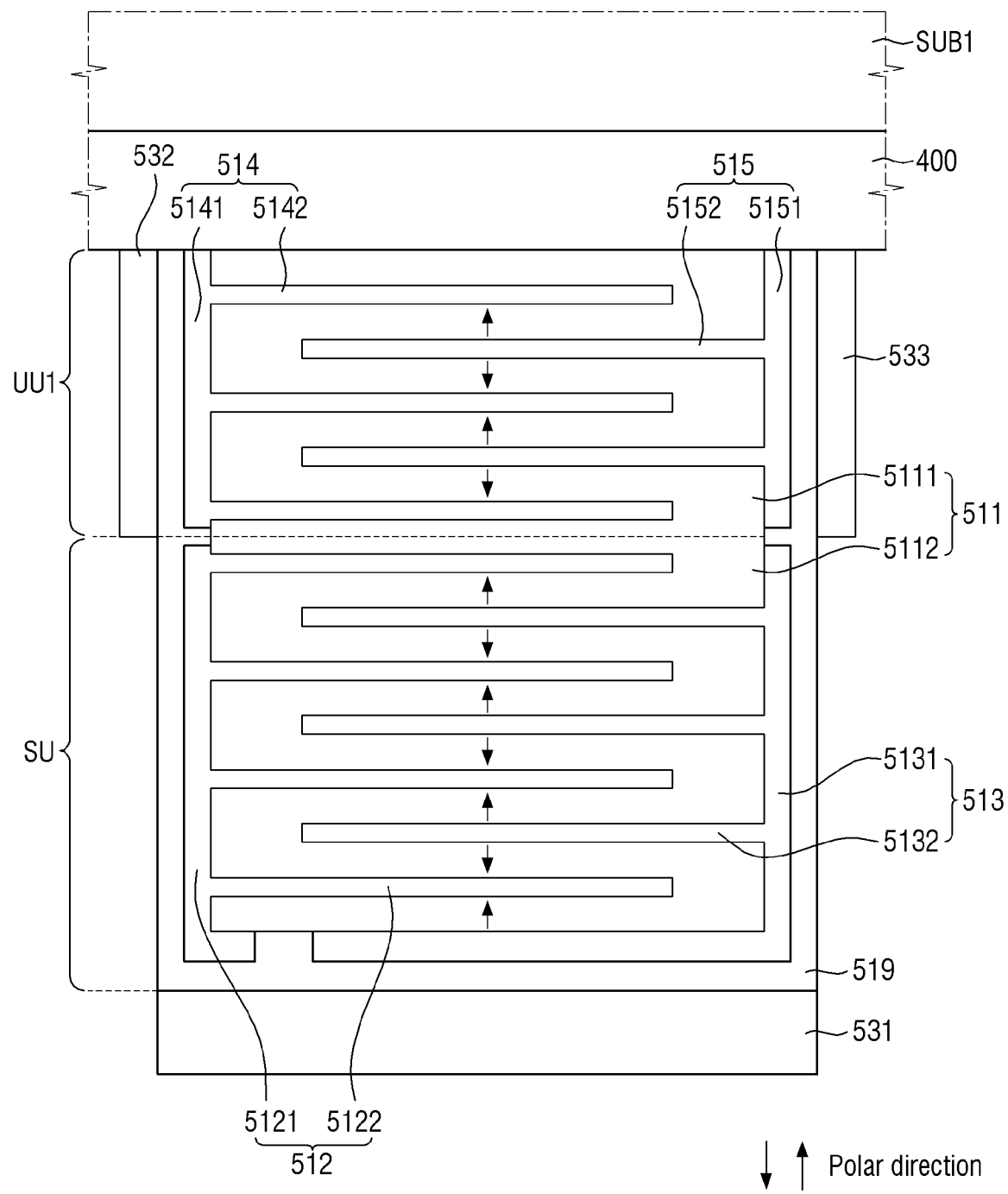
FIG. 21 is a cross-sectional view showing an embodiment of the vibration generator of FIG. 20.

FIG. 21 is a cross-sectional view showing an embodiment of the vibration generator of FIG. 20.

The embodiment shown in FIG. 21 is substantially the same as the embodiment shown in FIG. 14 except that the second ultrasonic wave absorbing film 532 is disposed on the first side surface of the first ultrasonic wave output unit UU1 and the third ultrasonic wave absorbing film 533 is disposed on the second side surface of the first ultrasonic wave output unit UU1. The same or like elements shown in FIG. 21 have been labeled with the same reference characters as used above to describe the embodiment of FIG. 14, and any repetitive detailed description thereof will hereinafter be omitted or simplified.

Referring to FIG. 21, the second ultrasonic wave absorbing film 532 may be disposed on the protective layer 519 disposed on the first side surface of the first ultrasonic wave output unit UU1, and the third ultrasonic wave absorbing film 533 may be disposed on the protective layer 519 disposed on the second side surface of the first ultrasonic wave output unit UU1. In such an embodiment, the second ultrasonic wave absorbing film 532 and the third ultrasonic wave absorbing film 533 may be disposed on the protective layer 519 disposed on other side surfaces of the first ultrasonic wave output unit UU1. The second ultrasonic wave absorbing film 532 and the third ultrasonic wave absorbing film 533 may be disposed to surround the side surfaces of the first ultrasonic wave output unit UU1.

The second ultrasonic wave absorbing film 532 may be disposed to overlap the first ultrasonic wave output unit UU1 in the first direction (X-axis direction). The second ultrasonic wave absorbing film 532 may be disposed not to overlap the sound output unit SU in the first direction (X-axis direction). The third ultrasonic wave absorbing film 533 may be disposed to overlap the first ultrasonic wave output unit UU1 in the first direction (X-axis direction). The third ultrasonic wave absorbing film 533 may be disposed not to overlap the sound output unit SU in the first direction (X-axis direction).

In an embodiment, where the protective layer 519 disposed on the lower surface of the sound output unit SU and the first and second side surfaces of the first ultrasonic wave output unit UU1 is omitted, the first vibration layer 5111, the second vibration layer 5112, the first electrode 512, the second electrode 513, the third electrode 514, and the fourth electrode 515 may be protected by the first ultrasonic wave absorbing film 531, the second ultrasonic wave absorbing film 532, and the third ultrasonic wave absorbing film 533. Therefore, in such an embodiment, the protective layer 519 overlapping the first ultrasonic wave absorbing film 531 in the thickness direction (Z-axis direction) of the vibration generator 510, and the protective layer 519 overlapping the second ultrasonic wave absorbing film 532 and the third ultrasonic wave absorbing film 533 in the first direction (X-axis direction) may be omitted.

Figure 22:
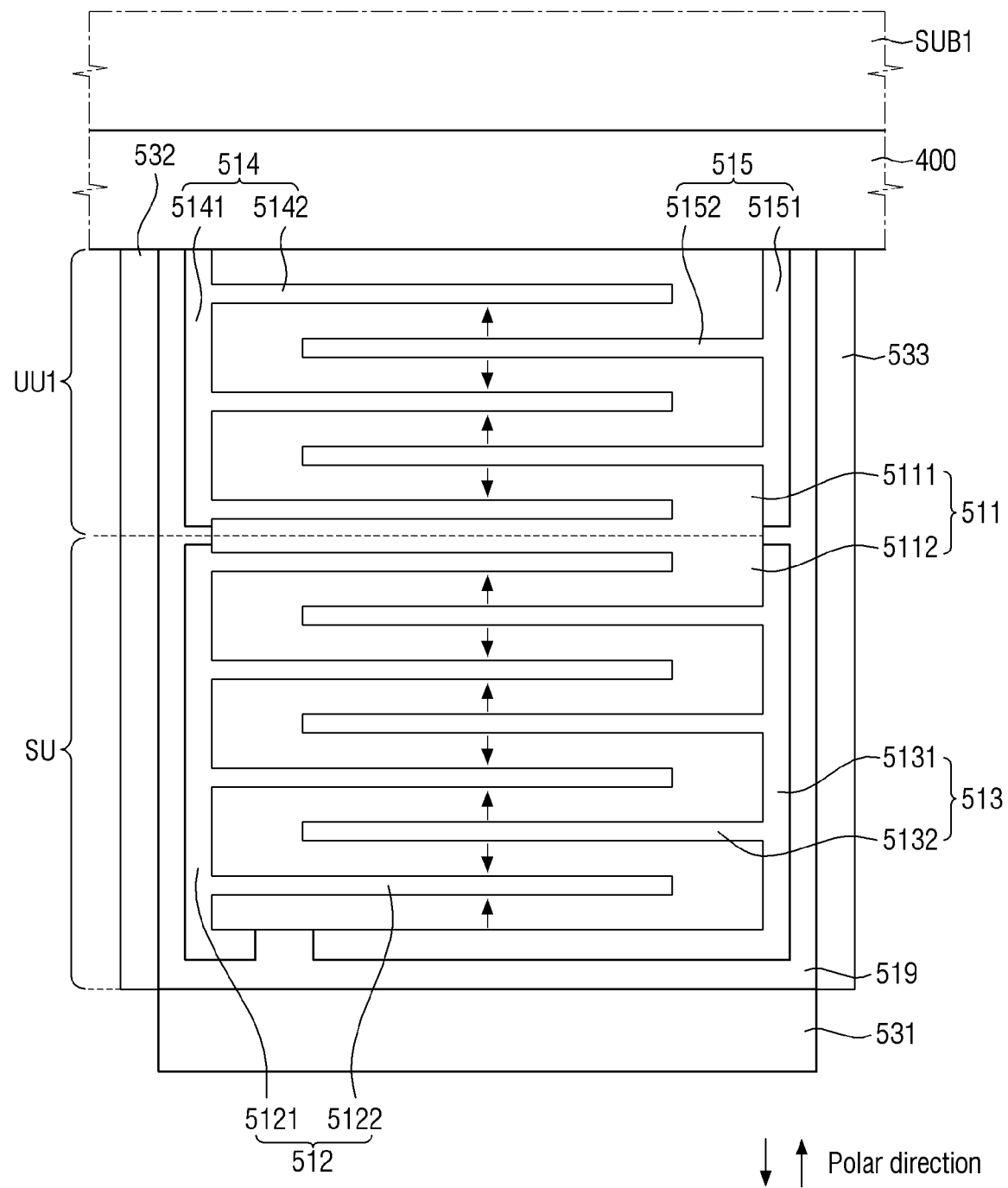
FIG. 22 is a cross-sectional view showing an alternative embodiment of the vibration generator of FIG. 20.

FIG. 22 is a cross-sectional view showing an alternative embodiment of the vibration generator of FIG. 20.

The embodiment shown in FIG. 22 is substantially the same as the embodiment shown in FIG. 21 except that the second ultrasonic wave absorbing film 532 overlaps the sound output unit SU in the first direction (X-axis direction) and the third ultrasonic wave absorbing film 533 overlaps the sound output unit SU in the first direction (X-axis direction). The same or like elements shown in FIG. 22 have been labeled with the same reference characters as used above to describe the embodiment of FIG. 21, and any repetitive detailed description thereof will hereinafter be omitted.

Figure 23:
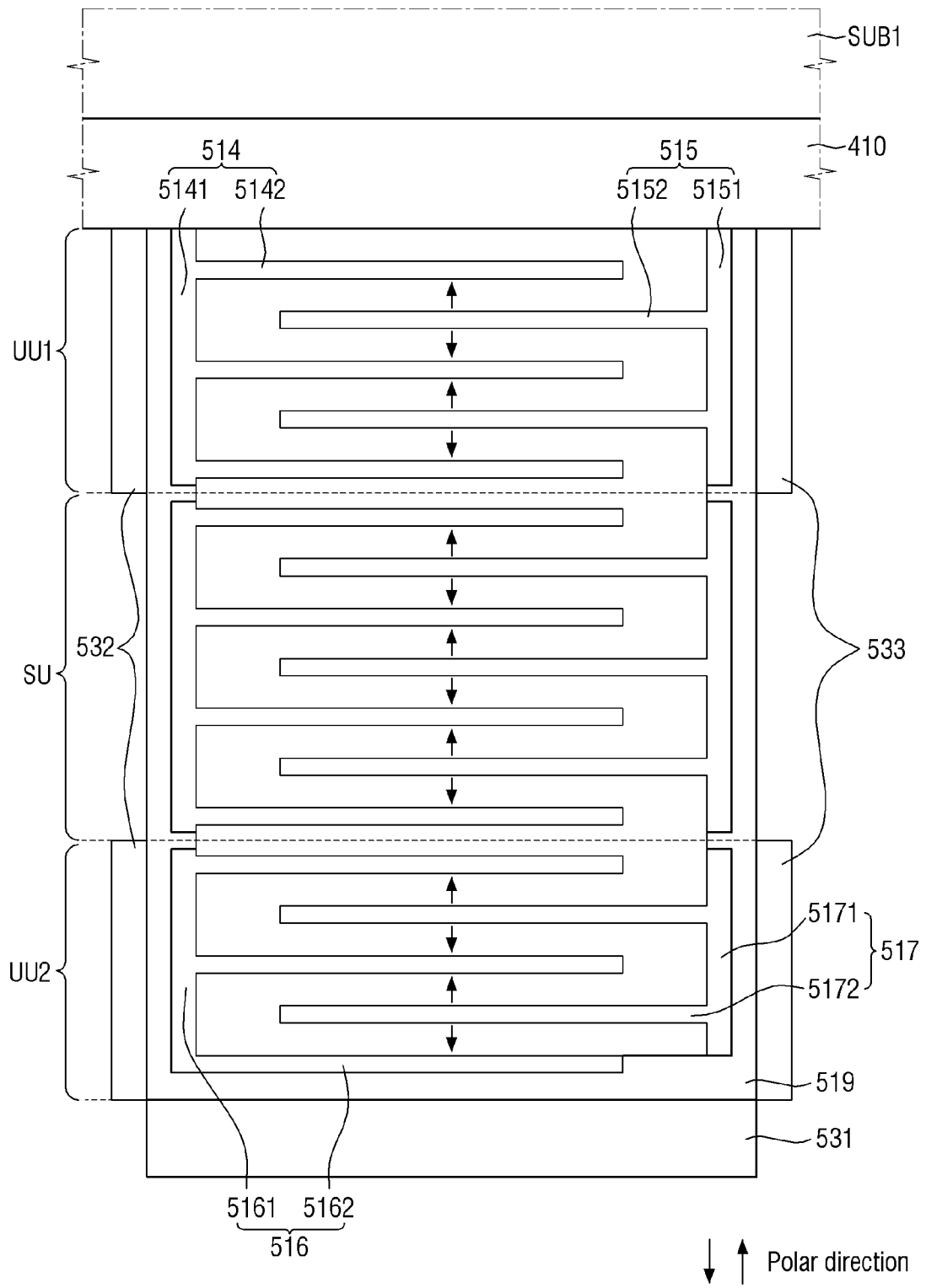
FIG. 23 is a cross-sectional view showing an embodiment of the vibration generator of FIG. 20.

FIG. 23 is a cross-sectional view showing another alternative embodiment of the vibration generator of FIG. 20.

The embodiment shown in FIG. 23 is substantially the same as the embodiment shown in FIG. 15 except that the second ultrasonic wave absorbing film 532 is disposed on the first side surface of the first ultrasonic wave output unit UU1 and the first side surface of the second ultrasonic wave output unit UU2, and the third ultrasonic wave absorbing film 533 is disposed on the second side surface of the first ultrasonic wave output unit UU1 and the second side surface of the second ultrasonic wave output unit UU2. The same or like elements shown in FIG. 23 have been labeled with the same reference characters as used above to describe the embodiment of FIG. 15, and any repetitive detailed description thereof will hereinafter be omitted.

Referring to FIG. 23, in an embodiment, the second ultrasonic wave absorbing film 532 may be disposed on the protective layer 519 disposed on the first side surface of the first ultrasonic wave output unit UU1 and the first side surface of the second ultrasonic wave output unit UU2, and the third ultrasonic wave absorbing film 533 may be disposed on the protective layer 519 disposed on the second side surface of the first ultrasonic wave output unit UU1 and the second side surface of the second ultrasonic wave output unit UU2. In such an embodiment, the second ultrasonic wave absorbing film 532 and the third ultrasonic wave absorbing film 533 may be disposed on the protective layer 519 disposed on other side surfaces of the first ultrasonic wave output unit UU1 and other side surfaces of the second ultrasonic wave output unit UU2. The second ultrasonic wave absorbing film 532 and the third ultrasonic wave absorbing film 533 may be disposed to surround the side surfaces of the first ultrasonic wave output unit UU1 and the side surfaces of the first ultrasonic wave output unit UU2.

The second ultrasonic wave absorbing film 532 may be disposed to overlap the first ultrasonic wave output unit UU1 and the second ultrasonic wave output unit UU2 in the first direction (X-axis direction). The second ultrasonic wave absorbing film 532 may be disposed not to overlap the sound output unit SU in the first direction (X-axis direction). The third ultrasonic wave absorbing film 533 may be disposed to overlap the first ultrasonic wave output unit UU1 and the second ultrasonic wave output unit UU2 in the first direction (X-axis direction). The third ultrasonic wave absorbing film 533 may be disposed not to overlap the sound output unit SU in the first direction (X-axis direction).

In an embodiment, where the protective layer 519 disposed on the lower surface of the sound output unit SU, the first and second side surfaces of the first ultrasonic wave output unit UU1, and the first and second side surfaces of the second ultrasonic wave output unit UU2 is omitted, the first vibration layer 5111, the second vibration layer 5112, the third vibration layer 5113, the first electrode 512, the second electrode 513, the third electrode 514, the fourth electrode 515, the fifth electrode 516, and the sixth electrode 517 may be protected by the first ultrasonic wave absorbing film 531, the second ultrasonic wave absorbing film 532, and the third ultrasonic wave absorbing film 533. Therefore, in such an embodiment, the protective layer 519 overlapping the first ultrasonic wave absorbing film 531 in the thickness direction (Z-axis direction) of the vibration generator 510, and the protective layer 519 overlapping the second ultrasonic wave absorbing film 532 and the third ultrasonic wave absorbing film 533 in the first direction (X-axis direction) may be omitted.

Figure 24:
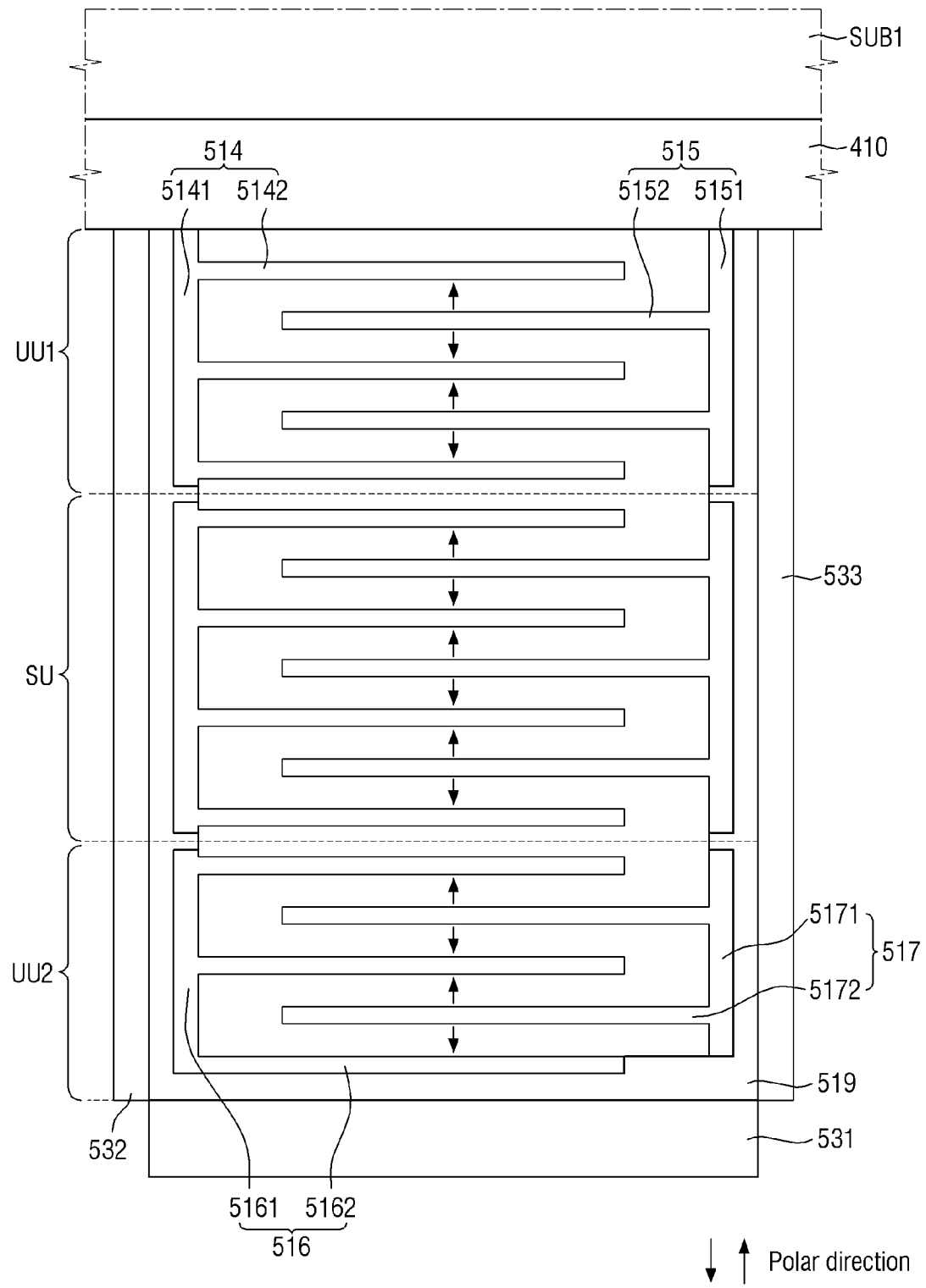
FIG. 24 is a cross-sectional view showing an alternative embodiment of the vibration generator of FIG. 20.

FIG. 24 is a cross-sectional view showing another example of the vibration generator of FIG. 20.

The embodiment shown in FIG. 24 is substantially the same as the embodiment shown in FIG. 23 except that the second ultrasonic wave absorbing film 532 overlaps the sound output unit SU in the first direction (X-axis direction) and the third ultrasonic wave absorbing film 533 overlaps the sound output unit SU in the first direction (X-axis direction). The same or like elements shown in FIG. 24 have been labeled with the same reference characters as used above to describe the embodiment of FIG. 23, and any repetitive detailed description thereof will hereinafter be omitted.

Figure 25:
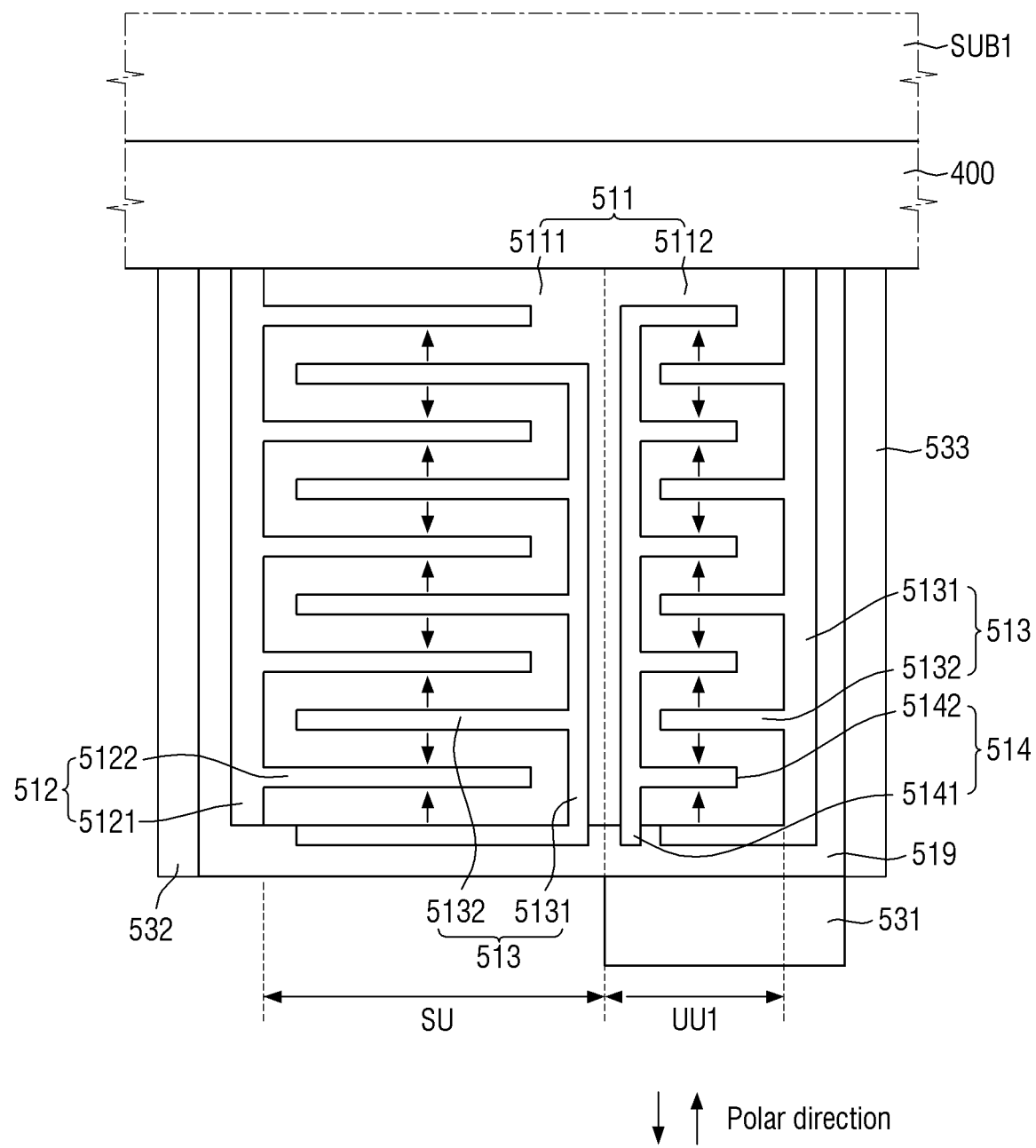
FIG. 25 is a cross-sectional view showing another alternative embodiment of the vibration generator of FIG. 20.

FIG. 25 is a cross-sectional view showing another example of the vibration generator of FIG. 20.

The embodiment shown in FIG. 25 is substantially the same as the embodiment shown in FIG. 16 except that the second ultrasonic wave absorbing film 532 is disposed on the first side surface of the sound output unit SU of the vibration generator 510, and the third ultrasonic wave absorbing film 533 is disposed on the first side surface of the first ultrasonic wave output unit UU1 of the vibration generator 510. The same or like elements shown in FIG. 25 have been labeled with the same reference characters as used above to describe the embodiment of FIG. 16, and any repetitive detailed description thereof will hereinafter be omitted or simplified.

Referring to FIG. 25, in an embodiment, the second ultrasonic wave absorbing film 532 may be disposed on the protective layer 519 disposed on the first side surface of the sound output unit SU, and the third ultrasonic wave absorbing film 533 may be disposed on the protective layer 519 disposed on the first side surface of the first ultrasonic wave output unit UU1. In such an embodiment, the second ultrasonic wave absorbing film 532 may be disposed on the protective layer 519 disposed on other side surfaces of the sound output unit SU. The second ultrasonic wave absorbing film 532 may be disposed to surround the side surfaces of the sound output unit SU. In such an embodiment, the third ultrasonic wave absorbing film 533 may be disposed on the protective layer 519 disposed on other side surfaces of the first ultrasonic wave output unit UU1. The third ultrasonic wave absorbing film 533 may be disposed to surround the side surfaces of the first ultrasonic wave output unit UU1.

The second ultrasonic wave absorbing film 532 may be disposed to overlap the sound output unit SU and the first ultrasonic wave output unit UU1 in the first direction (X-axis direction). The third ultrasonic wave absorbing film 533 may be disposed to overlap the sound output unit SU and the first ultrasonic wave output unit UU1 in the first direction (X-axis direction).

In an embodiment, where the protective layer 519 disposed on the side surfaces of the sound output unit SU and the lower surface and side surfaces of the first ultrasonic wave output unit UU1 is omitted, the first vibration layer 5111, the second vibration layer 5112, the first electrode 512, the second electrode 513, the third electrode 514, and the fourth electrode 515 may be protected by the first ultrasonic wave absorbing film 531, the second ultrasonic wave absorbing film 532, and the third ultrasonic wave absorbing film 533. Therefore, in such an embodiment, the protective layer 519 overlapping the first ultrasonic wave absorbing film 531 in the thickness direction (Z-axis direction) of the vibration generator 510, and the protective layer 519 overlapping the second ultrasonic wave absorbing film 532 and the third ultrasonic wave absorbing film 533 in the first direction (X-axis direction) may be omitted.

In an embodiment, as shown in FIG. 25, the first ultrasonic wave absorbing film 531 overlaps the first ultrasonic wave output unit UU1 in the thickness direction (Z-axis direction) of the vibration generator 510, and does not overlap the sound output unit SU, but the invention is not limited thereto. Alternatively, the first ultrasonic wave absorbing film 531 may be disposed to overlap the sound output unit SU and the first ultrasonic wave output unit UU1 in the thickness direction (Z-axis direction) of the vibration generator 510. In such an embodiment, the first ultrasonic wave absorbing film 531 may be disposed on the protective layer 519 disposed on the lower surface of the sound output unit SU.

Figure 26:
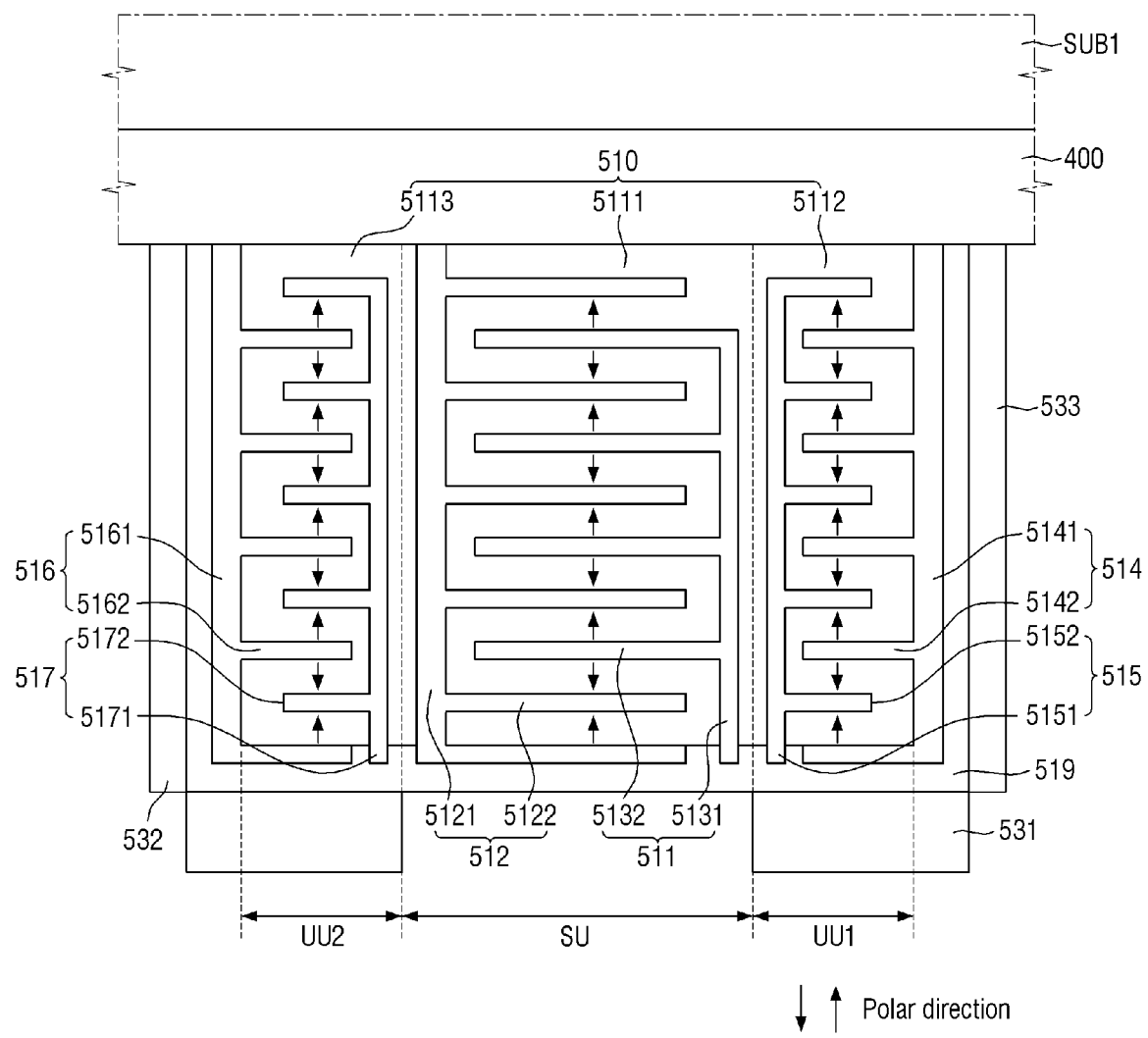
FIG. 26 is a cross-sectional view showing another alternative embodiment of the vibration generator of FIG. 20.

FIG. 26 is a cross-sectional view showing another example of the vibration generator of FIG. 20.

The embodiment shown in FIG. 26 is substantially the same as the embodiment shown in FIG. 16 except that the second ultrasonic wave absorbing film 532 is disposed on the first side surface of the second ultrasonic wave output unit UU2 of the vibration generator 510, and the third ultrasonic wave absorbing film 533 is disposed on the first side surface of the first ultrasonic wave output unit UU1 of the vibration generator 510. The same or like elements shown in FIG. 26 have been labeled with the same reference characters as used above to describe the embodiment of FIG. 16, and any repetitive detailed description thereof will hereinafter be omitted or simplified.

Referring to FIG. 26, in an embodiment, the second ultrasonic wave absorbing film 532 may be disposed on the protective layer 519 disposed on the first side surface of the second ultrasonic wave output unit UU2, and the third ultrasonic wave absorbing film 533 may be disposed on the protective layer 519 disposed on the first side surface of the first ultrasonic wave output unit UU1. In such an embodiment, the second ultrasonic wave absorbing film 532 may be disposed on the protective layer 519 disposed on other side surfaces of the second ultrasonic wave output unit UU2. The second ultrasonic wave absorbing film 532 may be disposed to surround the side surfaces of the second ultrasonic wave output unit UU2. In such an embodiment, the third ultrasonic wave absorbing film 533 may be disposed on the protective layer 519 disposed on other side surfaces of the first ultrasonic wave output unit UU1. The third ultrasonic wave absorbing film 533 may be disposed to surround the side surfaces of the first ultrasonic wave output unit UU1.

The second ultrasonic wave absorbing film 532 may be disposed to overlap the first ultrasonic wave output unit UU1 and the second ultrasonic wave output unit UU2 in the first direction (X-axis direction). The third ultrasonic wave absorbing film 533 may be disposed to overlap the first ultrasonic wave output unit UU1 and the second ultrasonic wave output unit UU2 in the first direction (X-axis direction).

In an embodiment, where the protective layer 519 disposed on the lower surface and side surfaces of the first ultrasonic wave output unit UU1 and the lower surface and side surfaces of the second ultrasonic wave output unit UU2 is omitted, the first vibration layer 5111, the second vibration layer 5112, the third vibration layer 5113, the first electrode 512, the second electrode 513, the third electrode 514, the fourth electrode 515, the fifth electrode 516, and the sixth electrode 517 may be protected by the first ultrasonic wave absorbing film 531, the second ultrasonic wave absorbing film 532, and the third ultrasonic wave absorbing film 533.

Therefore, in such an embodiment, the protective layer 519 overlapping the first ultrasonic wave absorbing film 531 in the thickness direction (Z-axis direction) of the vibration generator 510, and the protective layer 519 overlapping the second ultrasonic wave absorbing film 532 and the third ultrasonic wave absorbing film 533 in the first direction (X-axis direction) may be omitted.

In an embodiment, as illustrated in FIG. 26 that the first ultrasonic wave absorbing film 531 overlaps the first ultrasonic wave output unit UU1 in the thickness direction (Z-axis direction) of the vibration generator 510, and does not overlap the sound output unit SU, but the invention is not limited thereto. Alternatively, the first ultrasonic wave absorbing film 531 may be disposed to overlap the sound output unit SU and the first ultrasonic wave output unit UU1 in the thickness direction (Z-axis direction) of the vibration generator 510. In such an embodiment, the first ultrasonic wave absorbing film 531 may be disposed on the protective layer 519 disposed on the lower surface of the sound output unit SU.

Figure 27:
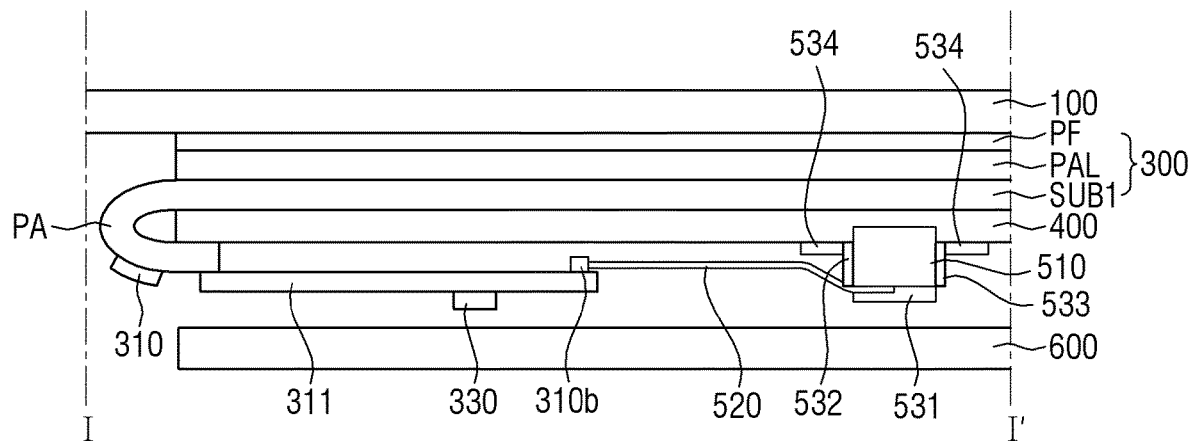
FIG. 27 is a cross-sectional view taken along line I-I' of FIG. 3 according to another alternative embodiment.
Figure 28:
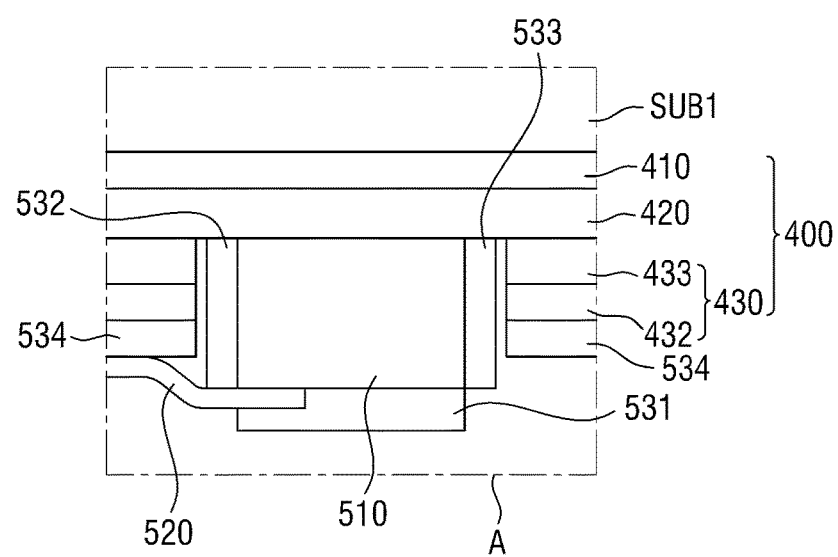
FIG. 28 is an enlarged cross-sectional view of the area B of FIG. 27.

FIG. 27 is a cross-sectional view taken along line I-I' of FIG. 3 according to another alternative embodiment, and FIG. 28 is an enlarged cross-sectional view of the area B of FIG. 27.

The embodiment shown in FIGS. 27 and 28 is substantially the same as the embodiment shown in FIG. 20 in that the display device 10 further includes a fourth ultrasonic wave absorbing film 534. The same or like elements shown in FIGS. 27 and 28 have been labeled with the same reference characters as used above to describe the embodiment of FIG. 20, and any repetitive detailed description thereof will hereinafter be omitted or simplified.

Referring to FIG. 27, in an embodiment, a fourth ultrasonic wave absorbing film 534 may be disposed on the bottom cover 400 adjacent to the side surfaces of the vibration generator 510 to reduce the ultrasonic waves output to the back surface of the display device 10. In such an embodiment, as shown in FIG. 28, when the vibration generator 510 is disposed on the heat radiation film 430 of the bottom cover 400, the first heat radiation layer of the heat radiation film 430 may be broken by the vibration of the vibration generator 510, and thus the vibration generator 510 may be attached to the lower surface of the buffer film 420 in an area where the heat radiation film 430 is removed. In such an embodiment, the fourth ultrasonic wave absorbing film 534 may be attached to the lower surface of the heat radiation film 430. The fourth ultrasonic wave absorbing film 534 may be attached to the lower surface of the heat radiation film 430 using an adhesive member such as a PSA.

In an embodiment, the fourth ultrasonic wave absorbing film 534 may be disposed over the entire front surface of the lower surface of the bottom cover 400, except for the area where the vibration generator 510 is disposed, but the invention is not limited thereto. In an embodiment, as shown in FIG. 27, the fourth ultrasonic wave absorbing film 534 may be disposed in some areas of the bottom cover 400 adjacent to the side surfaces of the vibration generator 510. The fourth ultrasonic wave absorbing film 534 may be disposed to surround the side surfaces of the vibration generator 510.

In an embodiment, as described above with reference to FIG. 9, the ultrasonic waves generated by vibrating the display panel 300 using the vibration generator 510 may be detected over the entire back surface of the display panel 300. Therefore, when the fourth ultrasonic wave absorbing film 534 is disposed on the bottom cover 400, the ultrasonic waves output to the back surface of the display device 10 may be further reduced.

In such an embodiment, the fourth ultrasonic wave absorbing film 534 may be substantially the same as the first ultrasonic wave absorbing film 531 described above with reference to FIG. 6, and any repetitive detailed descriptions of the fourth ultrasonic wave absorbing film 534 will be omitted.

According to an embodiment, as shown in FIG. 27, the first ultrasonic wave absorbing film 531, the second ultrasonic wave absorbing film 532, the third ultrasonic wave absorbing film 533, and the fourth ultrasonic wave absorbing film 534 may absorb the ultrasonic waves generated by vibrating the display panel 300 using the vibration generator 510. Therefore, in such an embodiment, when the vibration generator 510 and the microphone 750 are used as a proximity sensor for detecting an object close to the front surface of the display device, the detection accuracy of the proximity sensor may be increased.

Figure 29:
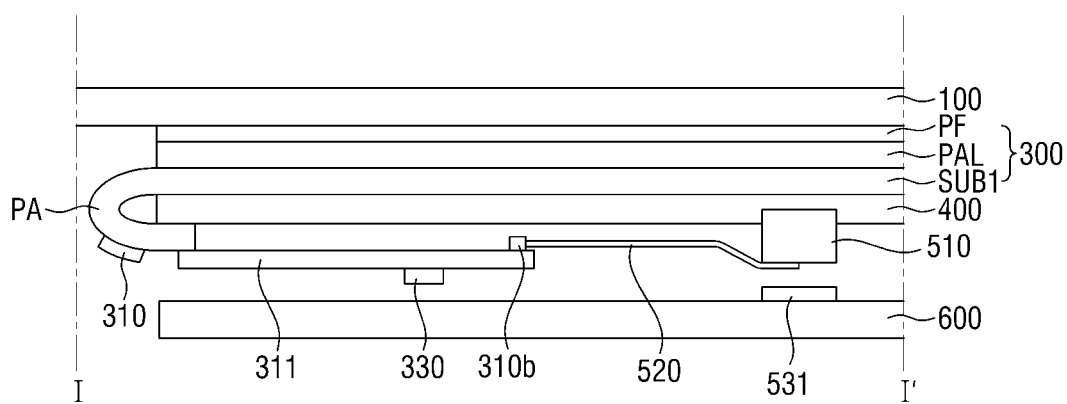
FIG. 29 is a cross-sectional view taken along line I-I' of FIG. 3 according to another alternative embodiment.
Figure 30:
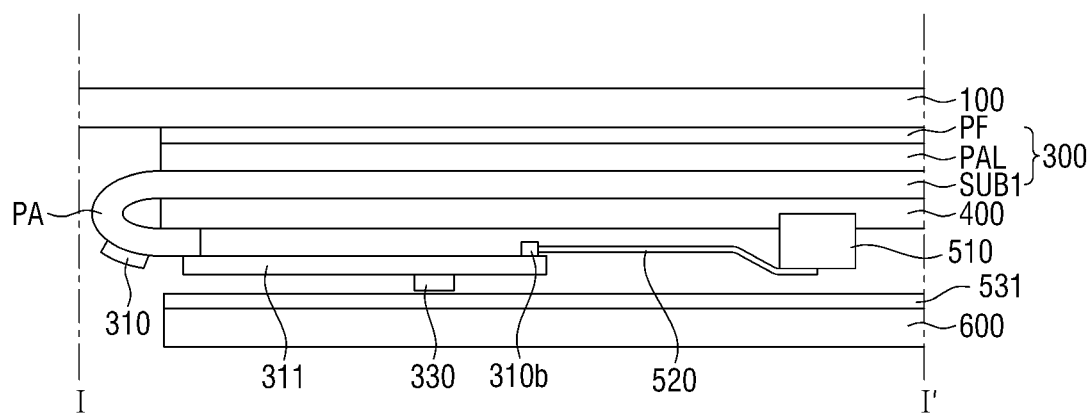
FIG. 30 is a cross-sectional view taken along line I-I' of FIG. 3 according to another alternative embodiment.

FIG. 29 is a cross-sectional view taken along line I-I' of FIG. 3 according to another alternative embodiment, and FIG. 30 is a cross-sectional view taken along line I-I' of FIG. 3 according to another alternative embodiment.

The embodiment shown in FIG. 29 is substantially the same as the embodiment shown in FIG. 6 except that the display device 10 includes a first ultrasonic wave absorbing film 531 disposed on the middle frame 600. The same or like elements shown in FIG. 29 have been labeled with the same reference characters as used above to describe the embodiment of FIG. 6, and any repetitive detailed description thereof will hereinafter be omitted or simplified.

Referring to FIG. 29, in an embodiment, a first ultrasonic wave absorbing film 531 may be disposed on the first surface of the middle frame 600 facing the second surface of the display panel 300 to reduce the ultrasonic waves output to the back surface of the display device 10. The first ultrasonic wave absorbing film 531 may be attached to the first surface of the middle frame 600 using an adhesive member such as a PSA. The first ultrasonic wave absorbing film 531 may be disposed to overlap the vibration generator 510 in the thickness direction (Z-axis direction) of the display panel 300. When the ultrasonic waves generated by vibrating the display panel 300 using the vibration generator 510 travel toward the back side surface of the display panel 300, such ultrasonic waves may be absorbed by the first ultrasonic wave absorbing film 531.

In an embodiment, as illustrated in FIG. 29, the first ultrasonic wave absorbing film 531 is disposed on the first surface of the middle frame 600 in an area overlapping the vibration generator 510 in the thickness direction (Z-axis direction) of the display panel 300, but the invention is not limited thereto. Since the ultrasonic waves generated by vibrating the display panel 300 using the vibration generator 510 may be detected over the entire back surface of the display panel 300 as described above with reference to FIG. 9, in an alternative embodiment, the first ultrasonic wave absorbing film 531 may be disposed on the entire first surface of the middle frame 600 as shown in FIG. 30 to reduce the ultrasonic waves output to the back surface of the display device 10.

In such an embodiment, the first ultrasonic wave absorbing film 531 is substantially the same as the first ultrasonic wave absorbing film 531 described above with reference to FIG. 6, and any repetitive detailed description of the first ultrasonic wave absorbing film 531' will be omitted.

According to an embodiment shown in FIG. 29, the first ultrasonic wave absorbing film 531 may absorb the ultrasonic waves generated by vibrating the display panel 300 using the vibration generator 510. Therefore, when the vibration generator 510 and the microphone 750 are used as a proximity sensor for detecting an object close to the front surface of the display device, the detection accuracy of the proximity sensor may be increased.

According to an embodiment of a display device, a vibration generator for vibrating a display panel to output a sound or ultrasonic waves is disposed on a surface of the display panel. Thus, a sound or ultrasonic waves is output using the display panel as a vibration surface by the vibration generator not exposed to an outside. Accordingly, since a call receiver for outputting the voice of a counterpart from the front surface of the display device and a proximity sensor for determining whether a user is located close to the front surface of the display device may be omitted, the light transmitting area of a cover window may be enlarged, and thus an area where an image is displayed by the display panel may be enlarged.

According to an embodiment of a display device, ultrasonic waves generated by vibrating the display panel using the vibration generator may be absorbed by an ultrasonic wave absorbing film. Accordingly, when the vibration generator and the microphone are used as a proximity sensor for detecting an object close to the front surface of the display device, the amount of the ultrasonic waves toward the back surface of the display device into the microphone as noise may be reduced, and thus the detection accuracy of the proximity sensor may be increased.

According to an embodiment of a display device, since the vibration generator is divided into a sound output unit and a first ultrasonic wave output unit, a sound output in a sound mode and ultrasonic wave output in an ultrasonic mode may be effectively performed.

According to an embodiment of a display device, since the vibration generator includes two ultrasonic wave output units, ultrasonic waves of a high SPL may be output as compared to a case where the vibration generator includes a single ultrasonic wave output unit.

The invention should not be construed as being limited to the embodiments set forth herein. Rather, these embodiments are provided so that this disclosure will be thorough and complete and will fully convey the concept of the invention to those skilled in the art.

While the inventions have been particularly shown and described with reference to some embodiments thereof, it will be understood by one of ordinary skill in the art that various changes in form and detail may be made therein without departing from the spirit and scope of the invention as defined by the following claims.

What is claimed is:

1. A display device, comprising:
a display panel including a first substrate and a pixel array layer disposed on a first surface of the first substrate;
a vibration generator disposed on a second surface of the first substrate, which is opposite to the first surface of the first substrate, wherein the vibration generator outputs ultrasonic waves; and
a first ultrasonic wave absorbing film overlapping the vibration generator in a thickness direction of the display panel, wherein the first ultrasonic wave absorbing film absorbs the ultrasonic waves.

2. The display device of claim 1, wherein
a first surface of the vibration generator faces the second surface of the first substrate, and
the first ultrasonic wave absorbing film is disposed on a second surface of the vibration generator, which is opposite to the first surface of the vibration generator.

3. The display device of claim 2, further comprising:
a second ultrasonic wave absorbing film disposed on a first side surface of the vibration generator, wherein the second ultrasonic wave absorbing film absorbs the ultrasonic waves.

4. The display device of claim 3, further comprising:
a third ultrasonic wave absorbing film disposed on a second side surface of the vibration generator, wherein the second ultrasonic wave absorbing film absorbs the ultrasonic waves.

5. The display device of claim 4,
wherein the second ultrasonic wave absorbing film and the third ultrasonic wave absorbing film surround side surfaces of the vibration generator.

6. The display device of claim 2, further comprising:
a bottom cover disposed on the second surface of the first substrate; and
a fourth ultrasonic wave absorbing film disposed on the bottom cover, and absorbing the ultrasonic waves.

7. The display device of claim 6, wherein the bottom cover includes:
a light blocking film disposed on the second surface of the first substrate;
a buffer film disposed on the light blocking film; and
a heat radiation film disposed on the buffer film,
wherein the fourth ultrasonic wave absorbing film is disposed on the heat radiation film.

8. The display device of claim 7, wherein
the vibration generator does not overlap the heat radiation film in the thickness direction of the display panel, and
the vibration generator is disposed on the buffer film.

9. The display device of claim 1, further comprising:
a frame disposed on the second surface of the first substrate,
wherein the first ultrasonic wave absorbing film is disposed on a first surface of the frame facing the second surface of the first substrate.

10. A display device, comprising:
a display panel including a first substrate and a pixel array layer disposed on a first surface of the first substrate;
a vibration generator including a sound output unit which vibrates the display panel to output a sound, and a first ultrasonic wave output unit which vibrates the display panel to output ultrasonic waves; and
a first ultrasonic wave absorbing film overlapping the first ultrasonic wave output unit in a thickness direction of the display panel, wherein the first ultrasonic wave absorbing film absorbs the ultrasonic waves.

11. The display device of claim 10, wherein
the sound output unit includes a first electrode to which a first driving voltage is applied, a second electrode to which a second driving voltage is applied, and a first vibration layer disposed between the first electrode and the second electrode, wherein the first vibration layer contracts and expands based on the first driving voltage and the second driving voltage, and
the first ultrasonic wave output unit includes a third electrode to which a third driving voltage is applied, a fourth electrode to which a fourth driving voltage is applied, and a second vibration layer disposed between the third electrode and the fourth electrode, wherein the second vibration layer contracts and expands based on the third driving voltage and the fourth driving voltage.

12. The display device of claim 10, wherein
the first ultrasonic wave output unit is disposed on a second surface of the first substrate, which is opposite to the first surface of the first substrate,
the sound output unit is disposed on the first ultrasonic wave output unit, and
the first ultrasonic wave absorbing film is disposed on the sound output unit.

13. The display device of claim 12, further comprising:
a second ultrasonic wave absorbing film disposed on a first side surface of the first ultrasonic wave output unit, wherein the second ultrasonic wave absorbing film absorbs the ultrasonic waves.

14. The display device of claim 13, further comprising:
a third ultrasonic wave absorbing film disposed on a second side surface of the first ultrasonic wave output unit, wherein the third ultrasonic wave absorbing film absorbs the ultrasonic waves.

15. The display device of claim 14, wherein
the second ultrasonic wave absorbing film and the third ultrasonic wave absorbing film surround side surfaces of the first ultrasonic wave output unit.

16. The display device of claim 14, wherein
the second ultrasonic wave absorbing film or the third ultrasonic wave absorbing film is disposed on a side surface of the sound output unit.

17. The display device of claim 10, wherein
the first ultrasonic wave output unit and the sound output unit are disposed on a second surface of the first substrate, which is opposite to the first surface of the first substrate, and
the first ultrasonic wave absorbing film is disposed on the first ultrasonic wave output unit.

18. The display device of claim 17, wherein
the first ultrasonic wave absorbing film is disposed on the sound output unit.

19. The display device of claim 17, wherein
a first side surface of the first ultrasonic wave output unit and a first side surface of the sound output unit are in direct contact with each other.

20. The display device of claim 17, further comprising:
a second ultrasonic wave absorbing film disposed on a second side surface of the first ultrasonic wave output unit, wherein the second ultrasonic wave absorbing film absorbs the ultrasonic waves; and
a third ultrasonic wave absorbing film disposed on a second side surface of the sound output unit, wherein the third ultrasonic wave absorbing film absorbs the ultrasonic waves.

21. The display device of claim 20, wherein
the second ultrasonic wave absorbing film surrounds side surfaces of the first ultrasonic wave output unit, and
the third ultrasonic wave absorbing film surrounds side surfaces of the sound output unit.

22. The display device of claim 10, wherein
the vibration generator further includes a second ultrasonic wave output unit which vibrates the display panel to output the ultrasonic waves.

23. The display device of claim 22, wherein
the second ultrasonic wave output unit includes a fifth electrode to which a fifth driving voltage is applied, a sixth electrode to which a sixth driving voltage is applied, and a third vibration layer disposed between the fifth electrode and the sixth electrode, wherein the third vibration layer contracts and expands based on the fifth driving voltage and the sixth driving voltage.

24. The display device of claim 22, wherein
the first ultrasonic wave output unit is disposed on a second surface of the first substrate, which is opposite to the first surface of the first substrate,
the sound output unit is disposed on the first ultrasonic wave output unit,
the second ultrasonic wave output unit is disposed on the sound output unit, and
the first ultrasonic wave absorbing film is disposed on the second ultrasonic wave output unit.

25. The display device of claim 24, further comprising:
a second ultrasonic wave absorbing film disposed on a first side surface of the second ultrasonic wave output unit, wherein second ultrasonic wave absorbing film absorbs the ultrasonic waves.

26. The display device of claim 25, further comprising:
a third ultrasonic wave absorbing film disposed on a second side surface of the second ultrasonic wave output unit, wherein the third ultrasonic wave absorbing film absorbs the ultrasonic waves.

27. The display device of claim 26, wherein
the second ultrasonic wave absorbing film and the third ultrasonic wave absorbing film surround side surfaces of the second ultrasonic wave output unit.

28. The display device of claim 26, wherein
the second ultrasonic wave absorbing film is disposed on a first side surface of the first ultrasonic wave output unit and a first side surface of the sound output unit.

29. The display device of claim 22, wherein
the first ultrasonic wave output unit, the sound output unit and the second ultrasonic wave output unit are disposed on a second surface of the first substrate, which is opposite to the first surface of the first substrate, and
the first ultrasonic wave absorbing film is disposed on the first ultrasonic wave output unit and the second ultrasonic wave output unit.

30. The display device of claim 29, wherein
the first ultrasonic wave absorbing film is disposed on the sound output unit.

31. The display device of claim 29, wherein
the sound output unit is disposed between the first ultrasonic wave output unit and the second ultrasonic wave output unit.

32. The display device of claim 29, wherein
a first side surface of the first ultrasonic wave output unit and a first side surface of the sound output unit are in direct contact with each other, and
a second side surface of the second ultrasonic wave output unit and a first side surface of the sound output unit are in direct contact with each other.

33. The display device of claim 32, further comprising:
a second ultrasonic wave absorbing film disposed on a second side surface of the first ultrasonic wave output unit, wherein the second ultrasonic wave absorbing film absorbs the ultrasonic waves; and
a third ultrasonic wave absorbing film disposed on a second side surface of the second ultrasonic wave output unit, wherein the third ultrasonic wave absorbing film absorbs the ultrasonic waves.

34. The display device of claim 33, wherein
the second ultrasonic wave absorbing film surrounds side surfaces of the first ultrasonic wave output unit, and
the third ultrasonic wave absorbing film surrounds side surfaces of the second ultrasonic wave output unit.

* * * * *